United States Patent
Yoshimoto

(10) Patent No.: US 12,061,022 B2
(45) Date of Patent: Aug. 13, 2024

(54) MAGNETIC FREEZING APPARATUS

(71) Applicant: DAIKIN INDUSTRIES, LTD., Osaka (JP)

(72) Inventor: Akio Yoshimoto, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 720 days.

(21) Appl. No.: 17/194,064

(22) Filed: Mar. 5, 2021

(65) Prior Publication Data

US 2021/0190390 A1 Jun. 24, 2021

Related U.S. Application Data

(63) Continuation of application No. PCT/JP2019/034285, filed on Aug. 30, 2019.

(30) Foreign Application Priority Data

Sep. 11, 2018 (JP) .................................. 2018-169439
Sep. 11, 2018 (JP) .................................. 2018-169442

(51) Int. Cl.
*F25B 21/00* (2006.01)

(52) U.S. Cl.
CPC ...... *F25B 21/00* (2013.01); *F25B 2321/0023* (2013.01)

(58) Field of Classification Search
CPC .............. F25B 21/00; F25B 2321/0021; F25B 2321/0023; Y02B 30/00
See application file for complete search history.

(56) References Cited

U.S. PATENT DOCUMENTS

2013/0327062 A1* 12/2013 Watanabe ............... F25B 21/00
62/3.1
2015/0033763 A1 2/2015 Saito et al.
(Continued)

FOREIGN PATENT DOCUMENTS

CN 101458008 A * 6/2009 ............. F25B 21/00
EP 2 527 520 A1 11/2012
(Continued)

OTHER PUBLICATIONS

International Preliminary Report of corresponding PCT Application No. PCT/JP2019/034285 dated Mar. 25, 2021.
(Continued)

*Primary Examiner* — Kun Kai Ma
(74) *Attorney, Agent, or Firm* — Global IP Counselors, LLP

(57) ABSTRACT

A magnetic refrigeration apparatus includes a main channel, a magnetic refrigerator, a fluid transfer mechanism connected to the main channel, and at least one control valve. A heating medium flows through the main channel. The magnetic refrigerator includes a magnetic working substance, a casing having a channel connected to the main channel, and a magnetic field modulator that applies a magnetic field variation to the magnetic working substance. The fluid transfer mechanism alternately performs a first operation of transferring the heating medium in the main channel in a first direction, and a second operation of transferring the heating medium in a second direction opposite to the first direction. The main channel includes at least one branch channel branching from a portion of the main channel between the magnetic refrigerator and the fluid transfer mechanism. The at least one control valve is connected to the at least one branch channel.

13 Claims, 22 Drawing Sheets

(56) References Cited

U.S. PATENT DOCUMENTS

2016/0258655 A1* 9/2016 Pfaffl .................. F25B 1/02
2019/0049158 A1* 2/2019 Nomura ................ H01F 1/012

FOREIGN PATENT DOCUMENTS

| EP | 3 312 529 A1 | 4/2018 |
|----|--------------|--------|
| JP | 2002-13807 A | 1/2002 |
| JP | 2004-317040 A | 11/2004 |
| JP | 2015-78790 A | 4/2015 |
| JP | 2018-124029 A | 8/2018 |
| WO | 2013/147177 A1 | 10/2013 |

OTHER PUBLICATIONS

International Search Report of corresponding PCT Application No. PCT/JP2019/034285 dated Nov. 12, 2019.
European Search Report of corresponding EP Application No. 19 86 0788.9 dated Mar. 3, 2022.

* cited by examiner

MAGNETIC FREEZING APPARATUS

CROSS-REFERENCE TO RELATED APPLICATIONS

This is a continuation of International Application No. PCT/JP2019/034285 filed on Aug. 30, 2019, which claims priority to Japanese Patent Application Nos. 2018-169439 and 2018-169442, both filed on Sep. 11, 2018. The entire disclosures of these applications are incorporated by reference herein.

BACKGROUND

Field of Invention

The present disclosure relates to a magnetic refrigeration apparatus.

Background Information

A magnetic refrigeration apparatus of Japanese Unexamined Patent Publication No. 2004-317040 includes a magnetic working substance, a magnetic field generator (magnetic field modulator) that applies a magnetic field to the magnetic working substance, a pump (fluid transfer mechanism), and heat exchangers. A liquid (heating medium) transferred by the pump flows around the magnetic working substance. A magnetic field applied to the magnetic working substance by the magnetic field modulator causes the magnetic working substance to generate heat. The heating medium heated by the magnetic working substance flows through the heat exchangers to exchange heat with air.

SUMMARY

A first aspect of the present disclosure is directed to a magnetic refrigeration apparatus including a main channel, a magnetic refrigerator, a fluid transfer mechanism, and at least one control valve. A heating medium flows through the main channel. The magnetic refrigerator includes a magnetic working substance, a casing having a channel connected to the main channel and containing the magnetic working substance, and a magnetic field modulator configured to apply a magnetic field variation to the magnetic working substance. The fluid transfer mechanism is connected to the main channel. The fluid transfer mechanism is configured to alternately perform a first operation of transferring the heating medium in the main channel in a first direction, and a second operation of transferring the heating medium in a second direction opposite to the first direction. The main channel includes at least one branch channel branching from a portion of the main channel between the magnetic refrigerator and the fluid transfer mechanism. The at least one control valve is connected to the at least one branch channel.

DETAILED DESCRIPTION OF EMBODIMENT(S)

Embodiments of the present disclosure are described below with reference to the drawings. The embodiments below are merely exemplary ones in nature, and are not intended to limit the scope, applications, or use of the present invention.

First Embodiment

A magnetic refrigeration apparatus (10) according to this embodiment controls the temperature of a heating medium by means of a magnetocaloric effect. The magnetic refrigeration apparatus (10) is applied to an air conditioner, for example.

Figure 1:
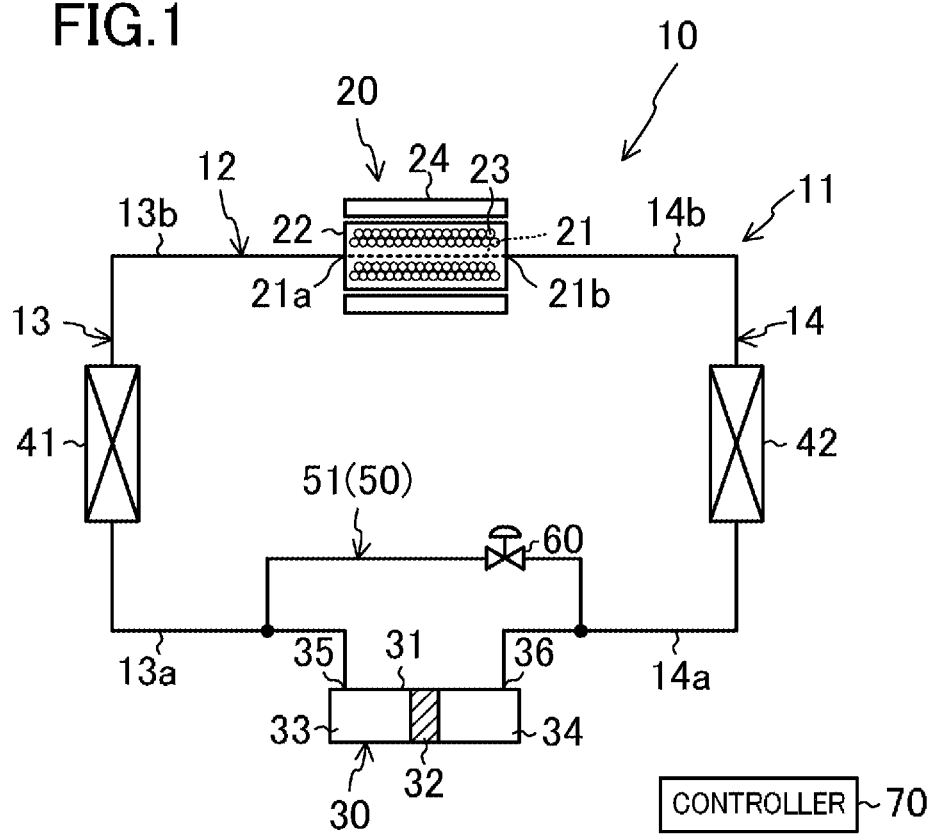
FIG. 1 is a piping system diagram schematically illustrating a configuration of a magnetic refrigeration apparatus according to a first embodiment.

As shown in FIG. 1, the magnetic refrigeration apparatus (10) includes a heating medium circuit (11) filled with the heating medium. The components of the heating medium circuit (11) are connected together through pipes. The heating medium circuit (11) has a main channel (12) forming a closed loop, and a branch channel (50) branching from the main channel (12).

The magnetic refrigeration apparatus (10) includes a magnetic refrigeration unit (20) (magnetic refrigerator), a pump (30), a low-temperature heat exchanger (41), and a high-temperature heat exchanger (42). The main channel (12) according to this embodiment is connected to the pump (30), the low-temperature heat exchanger (41), a temperature control channel (21) of the magnetic refrigeration unit (20), and the high-temperature heat exchanger (42) in this order.

The main channel (12) includes a low-temperature channel (13) and a high-temperature channel (14). The low-temperature channel (13) is located between one end of the temperature control channel (21) of the magnetic refrigeration unit (20) and a first port (35) of the pump (30). The low-temperature channel (13) constitutes a first channel. The one end of the temperature control channel (21) constitutes a first connecting port (21a). The high-temperature channel (14) is located between the other end of the temperature control channel (21) of the magnetic refrigeration unit (20) and a second port (36) of the pump (30). The high-temperature channel (14) constitutes a second channel. The other end of the temperature control channel (21) constitutes a second connecting port (21b). The low-temperature channel (13) may be a second channel, and the high-temperature channel (14) may be a first channel.

The low-temperature channel (13) includes a first pump-side pipe (13a) located between the low-temperature heat exchanger (41) and the pump (30), and a first magnetic-refrigeration-unit-side pipe (13b) located between the low-temperature heat exchanger (41) and the magnetic refrigeration unit (20). The high-temperature channel (14) includes a second pump-side pipe (14a) located between the high-temperature heat exchanger (42) and the pump (30), and a second magnetic-refrigeration-unit-side pipe (14b) located between the high-temperature heat exchanger (42) and the magnetic refrigeration unit (20).

Pump

The pump (30) according to this embodiment constitutes a fluid transfer mechanism that makes the heating medium in the main channel (12) flow reciprocally. Specifically, the pump (30) alternately repeats first and second operations. In the first operation, the pump (30) transfers the heating medium in the main channel (12) in a first direction (a direction indicated by a solid arrow in FIG. 2). In the second operation, the pump (30) transfers the heating medium in the main channel (12) in a second direction (a direction indicated by a solid arrow in FIG. 3) opposite to the first direction.

The pump (30) according to this embodiment is a reciprocating piston pump. The pump (30) includes a pump casing (31), and a piston (32) disposed to be movable forward and backward through the pump casing (31). The piston (32) partitions the interior of the pump casing (31) into a first chamber (33) and a second chamber (34). The pump casing (31) has the first port (35) communicating with the first chamber (33), and the second port (36) communicating with the second chamber (34). The first port (35) is connected to the low-temperature channel (13), and the second port (36) is connected to the high-temperature channel (14).

The piston (32) is driven by a driving mechanism (not shown). The driving mechanism includes, for example, a rod coupled to the piston (32), a crank coupled to the rod, and an electric motor that drives the crank. In response to the rotation of the crank by the electric motor, the rod moves forward and backward. This allows the piston (32) to reciprocate through the pump casing (31). The first and second operations therefore are alternately repeated.

In the first operation, the piston (32) moves toward the first port (35). Thus, the volume of the first chamber (33) decreases, and the volume of the second chamber (34) increases. The heating medium in the first chamber (33) therefore is discharged through the first port (35) to the low-temperature channel (13). Meanwhile, the heating medium in the high-temperature channel (14) is sucked through the second port (36) into the second chamber (34).

In the second operation, the piston (32) moves toward the second port (36). Thus, the volume of the second chamber (34) decreases, and the volume of the first chamber (33) increases. The heating medium in the second chamber (34) therefore is discharged through the second port (36) to the high-temperature channel (14). Meanwhile, the heating medium in the low-temperature channel (13) is sucked through the first port (35) into the first chamber (33).

Low-Temperature Heat Exchanger/High-Temperature Heat Exchanger

The low-temperature heat exchanger (41) exchanges heat between the heating medium cooled in the magnetic refrigeration unit (20) and a predetermined target to be cooled (e.g., a secondary refrigerant or air). The high-temperature heat exchanger (42) exchanges heat between the heating medium heated in the magnetic refrigeration unit (20) and a predetermined target to be heated (e.g., a secondary refrigerant or air).

Magnetic Refrigeration Unit

The magnetic refrigeration unit (20) includes a bed (22), a magnetic working substance (23) disposed in the temperature control channel (21) in the bed (22), and a magnetic field modulator (24) that applies a magnetic field variation to the magnetic working substance (23). The bed (22) is a hollow casing or column, and its interior is filled with the magnetic working substance (23). The magnetic working substance (23) has the property of generating heat when a magnetic field is applied thereto or when the magnetic field applied thereto is intensified, and absorbing heat when the magnetic field is removed therefrom or when the magnetic field applied thereto is weakened. Examples of the material of the magnetic working substance (23) include $Gd_5(Ge_{0.5}Si_{0.5})_4$, $La(Fe_{1-x}Si_x)_{13}$, $La(Fe_{1-x}Co_xSi_y)_{13}$, $La(Fe_{1-x}Si_x)_{13}H_y$, and $Mn(As_{0.9}Sb_{0.1})$.

The magnetic field modulator (24) controls the intensity of the magnetic field applied to the magnetic working substance (23). The magnetic field modulator (24) is comprised of an electromagnet capable of modulating a magnetic field, for example. The magnetic field modulator (24) performs a first modulation operation of applying a magnetic field to the magnetic working substance (23) or intensifying the magnetic field applied, and a second modulation operation of removing the magnetic field applied to the magnetic working substance (23), or weakening the magnetic field applied.

Branch Channel

The branch channel (50) serves to control the pressure of the main channel (12). The branch channel (50) serves to control the flow rate of the heating medium through the temperature control channel (21) of the magnetic refrigeration unit (20). Specifically, the branch channel (50) allows the heating medium in the main channel (12) to flow thereinto, and control the flow rate of the heating medium through the temperature control channel (21) according to the flow rate of the heating medium flowing into the branch channel (50).

The branch channel (50) according to this embodiment constitutes an intermediate channel (51) connected between the low-temperature channel (13) and the high-temperature channel (14). The intermediate channel (51) constitutes a communication passage through which the low-temperature channel (13) and the high-temperature channel (14) communicate with each other. One end of the intermediate channel (51) is connected to the first pump-side pipe (13a). The other end of the intermediate channel (51) is connected to the second pump-side pipe (14a).

The branch channel (50) is connected to a control valve (60). The control valve (60) constitutes a channel resistance regulator that regulates the channel resistance to control the flow rate of the heating medium flowing into the branch channel (50). The control valve (60) is a motor-operated valve, for example, and has an adjustable opening degree. The control valve (60) is connected to the branch channel (50) near the high-temperature channel (14). Specifically, the control valve (60) is connected to a portion of the intermediate channel (51) closer to the high-temperature channel (14) than to the low-temperature channel (13). The control valve (60) disposed near the high-temperature channel (14) can substantially prevent heat generated from the control valve (60) from moving to the low-temperature heating medium in the low-temperature channel (13).

The internal volume of the entire intermediate channel (51), which is the communication passage, is represented by Va. Meanwhile, the volume (amount) of the heating medium discharged from the pump (30) during the single first operation is represented by Vd1. The volume (amount) of the heating medium discharged from the pump (30) during the single second operation is represented by Vd2. The amount Vd1 of the heating medium discharged during the first operation of the pump (30) is equal to the amount Vd2 of the heating medium discharged during the second operation of the pump (30). The internal volume Va of the entire intermediate channel (51) is set to be greater than the amounts Vd1 and Vd2.

Controller

The magnetic refrigeration apparatus (10) includes a controller (70) that controls the control valve (60). The controller (70) includes a microcomputer and a memory device storing software for operating the microcomputer (specifically, a semiconductor memory). The controller (70) adjusts the opening degree of the control valve (60) based on a predetermined control signal.

Operation of Magnetic Refrigeration Apparatus

First, how the magnetic refrigeration apparatus (10) basically operates is described below. The magnetic refrigeration apparatus (10) alternately repeats a heating operation shown in FIG. 2 and a cooling operation shown in FIG. 3. The interval at which switching is made between the heating and cooling operations is set to be about one second.

Heating Operation

In the heating operation, the pump (30) performs the first operation, and the magnetic field modulator (24) performs the first modulation operation. In other words, in the heating operation, the heating medium is discharged through the first port (35) of the pump (30). Meanwhile, a magnetic field is applied to the magnetic working substance (23). Alternatively, the magnetic field applied is intensified.

When the heating medium is discharged from the first chamber (33) of the pump (30) to the low-temperature channel (13), the heating medium in the low-temperature channel (13) flows into the first connecting port (21a) of the temperature control channel (21) of the magnetic refrigeration unit (20). In the magnetic refrigeration unit (20) during the first modulation operation, heat is radiated from the magnetic working substance (23) toward its surrounding area. Thus, the heating medium flowing through the temperature control channel (21) is heated by the magnetic working substance (23). The heating medium heated in the temperature control channel (21) flows out of the second connecting port (21b) to the high-temperature channel (14), and flows through the high-temperature heat exchanger (42). The high-temperature heat exchanger (42) heats a predetermined target to be heated (e.g., a secondary refrigerant or air) using the high-temperature heating medium. The heating medium in the high-temperature channel (14) is sucked through the second port (36) of the pump (30) into the second chamber (34).

Cooling Operation

In the cooling operation, the pump (30) performs the second operation, and the magnetic field modulator (24) performs the second modulation operation. In other words, in the cooling operation, the heating medium is discharged through the second port (36) of the pump (30). Meanwhile, a magnetic field is removed from the magnetic working substance (23). Alternatively, the magnetic field applied is weakened.

When the heating medium is discharged from the second chamber (34) of the pump (30) to the high-temperature channel (14), the heating medium in the high-temperature channel (14) flows into the second connecting port (21b) of the temperature control channel (21) of the magnetic refrigeration unit (20). In the magnetic refrigeration unit (20) during the second modulation operation, the magnetic working substance (23) absorbs heat from its surrounding area. Thus, the heating medium flowing through the temperature control channel (21) is cooled by the magnetic working substance (23). The heating medium cooled in the temperature control channel (21) flows out of the first connecting port (21a) to the low-temperature channel (13), and flows through the low-temperature heat exchanger (41). The low-temperature heat exchanger (41) cools a predetermined target to be cooled (e.g., a secondary refrigerant or air) using the low-temperature heating medium. The heating medium in the low-temperature channel (13) is sucked through the first port (35) of the pump (30) into the first chamber (33).

Flow Rate Control Operation

The magnetic refrigeration apparatus (10) allows the flow rate of the heating medium through the temperature control channel (21) in each of the heating and cooling operations to be controlled without changing the flow rate of the heating medium discharged by the pump (30). The temperature difference between the high-temperature heating medium and the low-temperature heating medium therefore can be controlled. This flow rate control operation will be described in detail below.

Figure 2:
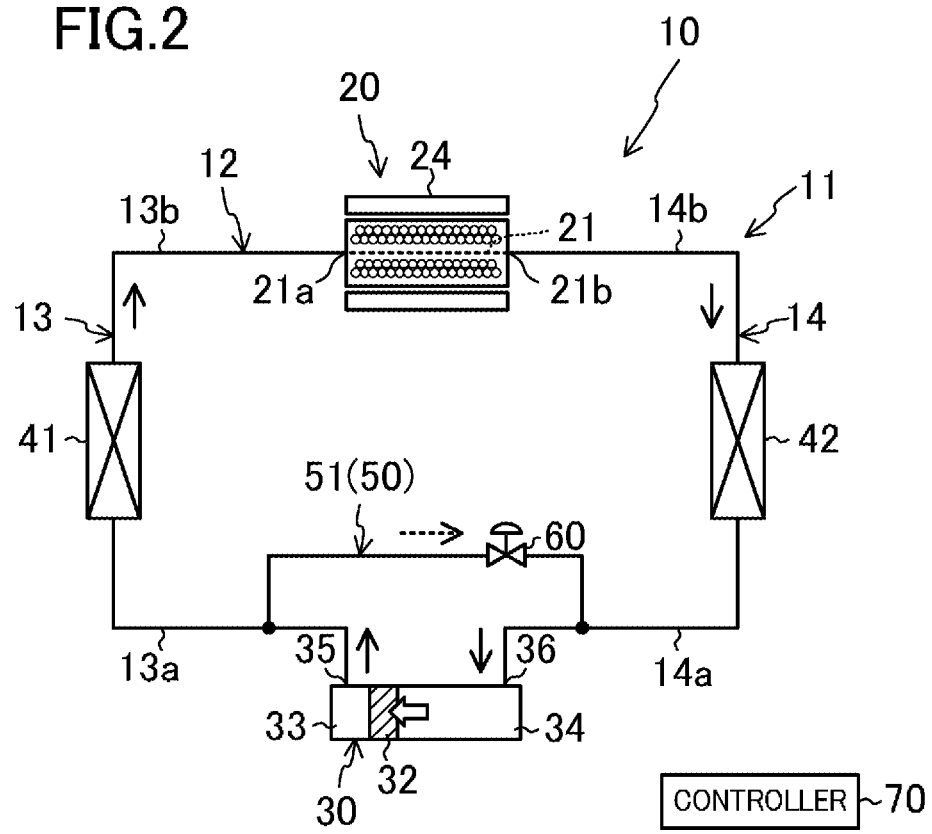
FIG. 2 is a piping system diagram schematically illustrating the configuration of the magnetic refrigeration apparatus according to the first embodiment, and further illustrates the flow of a heating medium during a heating operation.

In the heating operation shown in FIG. 2, with the control valve (60) fully closed, the whole heating medium transferred by the pump (30) flows through the temperature control channel (21). Thus, the flow rate Qc of the heating medium through the temperature control channel (21) is equal to the flow rate Q1 of the heating medium through the pump (30) during the first operation.

On the other hand, the control valve (60) opening at a predetermined opening degree allows the heating medium in the low-temperature channel (13) to flow into the branch channel (50) as indicated by the dashed arrow shown in FIG. 2. This reduces the flow rate Qc of the heating medium through the temperature control channel (21). Specifically, the flow rate Qc of the heating medium through the temperature control channel (21) is given by subtracting the flow rate Qd of the heating medium through the branch channel (50) from the flow rate Q1 of the heating medium through the pump (30) during the first operation (Qc=Q1−Qd). Thus, as the opening degree of the control valve (60) increases, the flow rate Qd of the heating medium through the branch channel (50) increases, and the flow rate Qc of the heating medium through the temperature control channel (21) decreases.

In the first operation, the flow rate of the heating medium through the temperature control channel (21) is appropriately controlled in the foregoing manner. The temperature of the heating medium heated by the magnetic working substance (23) therefore can be appropriately controlled in the temperature control channel (21).

Figure 3:
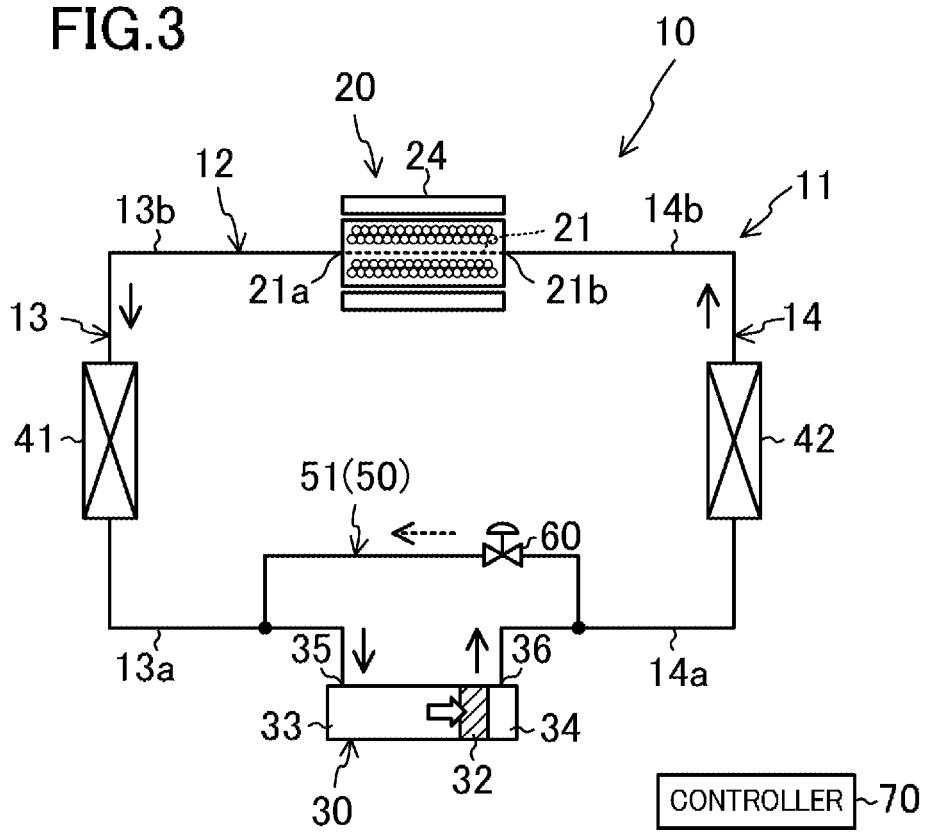
FIG. 3 is a piping system diagram schematically illustrating the configuration of the magnetic refrigeration apparatus according to the first embodiment, and further illustrates the flow of the heating medium during a cooling operation.

In the cooling operation shown in FIG. 3, with the control valve (60) fully closed, the whole heating medium transferred by the pump (30) flows through the temperature control channel (21). Thus, the flow rate Qc of the heating medium through the temperature control channel (21) is equal to the flow rate Q2 of the heating medium through the pump (30) during the second operation.

On the other hand, the control valve (60) opening at a predetermined opening degree allows the heating medium in the high-temperature channel (14) to flow into the branch channel (50) as indicated by a dashed arrow shown in FIG. 3. This reduces the flow rate Qc of the heating medium through the temperature control channel (21). Specifically, the flow rate Qc of the heating medium through the temperature control channel (21) is given by subtracting the flow rate Qd of the heating medium through the branch channel (50) from the flow rate Q2 of the heating medium through the pump (30) during the second operation (Qc=Q2−Qd). Thus, as the opening degree of the control valve (60) increases, the flow rate Qd of the heating medium through the branch channel (50) increases, and the flow rate Qc of the heating medium through the temperature control channel (21) decreases.

In the second operation, the flow rate of the heating medium through the temperature control channel (21) is appropriately controlled in the foregoing manner. The temperature of the heating medium cooled by the magnetic working substance (23) therefore can be appropriately controlled in the temperature control channel (21).

In the first and second operations, part of the heating medium in the main channel (12) is transferred to the branch channel (50) to control the pressure of the main channel (12).

Advantages of First Embodiment

In the foregoing embodiment, the heating medium in the main channel (12) is allowed to flow into the branch channel (50) to control the pressure of the main channel (12).

A known magnetic refrigeration apparatus may control the flow rate of a heating medium discharged by a fluid transfer mechanism, such as a pump, to adjust the temperature difference (temperature gradient) between the heating medium heated by the magnetic working substance and the magnetic working substance cooled by the magnetic working substance. However, in this case, the structure of the fluid transfer mechanism becomes complicated.

On the other hand, the foregoing embodiment allows the heating medium in the main channel (12) to flow into the branch channel (50) to control the flow rate of the heating medium through the temperature control channel (21). Thus, even a fixed displacement fluid transfer mechanism, such as the reciprocating pump (30), can control the flow rate of the heating medium through the temperature control channel (21).

Regulating the channel resistance of the branch channel (50) using the opening degree of the control valve (60) allows the flow rate of the heating medium through the branch channel (50) to be finely controlled, and in turn, allows the flow rate of the heating medium through the temperature control channel (21) to be finely controlled.

The branch channel (50) is the intermediate channel (51) connected between the low-temperature channel (13) and the high-temperature channel (14). Thus, the single branch channel (50) allows the flow of the heating medium to be separated into two streams in both of the heating and cooling operations.

The intermediate channel (51) is the communication passage through which the low-temperature channel (13) and the high-temperature channel (14) communicate with each other. This allows the suction pressure of the pump (30) to be applied to the intermediate channel (51), and the heating medium to flow promptly into the branch channel (50). Specifically, for example, in the heating operation, the suction pressure of a portion of the pump (30) near the second port (36) is applied to a high-temperature end of the branch channel (50). This allows the heating medium discharged from the first port (35) to flow promptly into the branch channel (50). For example, in the cooling operation, the suction pressure of a portion of the pump (30) near the first port (35) is applied to a low-temperature end of the branch channel (50). This allows the heating medium discharged from the second port (36) to flow promptly into the branch channel (50). As can be seen from the foregoing description, in the heating and cooling operations, part of the heating medium can flow promptly into the branch channel (50). This allows the flow rate of the heating medium through the temperature control channel (21) to be promptly changed, and allows improvement of the responsiveness to the control of the flow rate.

The internal volume of the branch channel (50), which is the communication passage, is greater than the amount of the heating medium discharged by the pump (30) during each of the first and second operations. This allows, in the first operation, the heating medium in the low-temperature channel (13) to be prevented from flowing through the branch channel (50) into the high-temperature channel (14). The second operation allows the heating medium in the high-temperature channel (14) to be prevented from flowing through the branch channel (50) into the low-temperature channel (13). The high-temperature heating medium and the low-temperature heating medium therefore can be prevented from being mixed together, thereby avoiding heat loss resulting from the mixing of these heating media.

The control valve (60) is disposed at a portion of the branch channel (50) near the high-temperature channel (14). This allows heat generated by the control valve (60) to be substantially prevented from moving to the heating medium in the low-temperature channel (13). The increase in the temperature of the heating medium in the low-temperature channel (13) due to the heat generated by the control valve (60) therefore can be reduced.

The branch channel (50), which is the intermediate channel (51), has one end connected to a portion of the low-temperature channel (13) between the pump (30) and the low-temperature heat exchanger (41) (i.e., the first pump-side pipe (13a)), and the other end connected to a portion of the high-temperature channel (14) between the pump (30) and the high-temperature heat exchanger (42) (i.e., the second pump-side pipe (14a)). Thus, in the heating operation, the heating medium that has passed through the low-temperature heat exchanger (41) is prevented from flowing into the branch channel (50). This allows so-called cold energy of the heating medium in the low-temperature heat exchanger (41) to be prevented from being discarded toward the branch channel (50). Likewise, in the cooling operation, the heating medium that has passed through the high-temperature heat exchanger (42) is prevented from flowing into the branch channel (50). This allows heat of the heating medium in the high-temperature heat exchanger (42) to be prevented from being discarded toward the branch channel (50).

Second Embodiment

Figure 4:
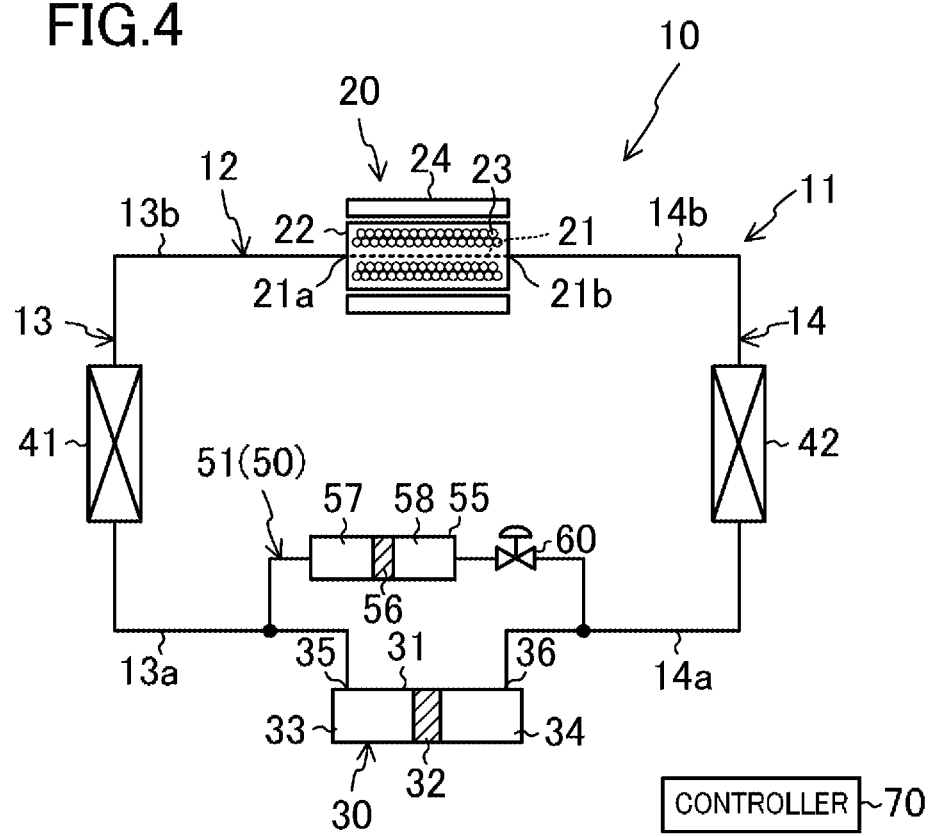
FIG. 4 corresponds to FIG. 1 and illustrates a second embodiment.

As shown in FIG. 4, a branch channel (50) according to a second embodiment forms an intermediate channel (51) connected between a low-temperature channel (13) and a high-temperature channel (14), just like the first embodiment. Meanwhile, strictly speaking, the low-temperature channel (13) and the high-temperature channel (14) do not communicate with each other through the intermediate channel (51) according to the second embodiment.

Specifically, the branch channel (50) according to the second embodiment is connected to a tubular cylinder (55). The low-temperature channel (13) and the high-temperature channel (14) communicate with each other through the internal space of the cylinder (55). The cylinder (55) includes therein a columnar partitioning member (56) that is movable forward and backward. The partitioning member (56) is fitted into the cylinder (55), and partitions the interior of the cylinder (55) into two portions. Specifically, the partitioning member (56) partitions the interior of the cylinder (55) into a first internal channel (57) communicating with the low-temperature channel (13) and a second internal channel (58) communicating with the high-temperature channel (14).

The pressure difference between the first and second internal channels (57) and (58) causes the partitioning member (56) to reciprocate through the cylinder (55). This varies the volumes of the first and second internal channels (57) and (58). The maximum volume Vmax1 of the first internal channel (57) is greater than the amount Vd1 of the heating medium discharged by a pump (30) during a single first operation. The maximum volume Vmax2 of the second internal channel (58) is greater than the amount Vd2 of the heating medium discharged by the pump (30) during a single second operation.

The branch channel (50) is connected to a control valve (60) in series with the cylinder (55). The control valve (60) is connected between the cylinder (55) and the high-temperature channel (14). This allows heat of the control valve (60) to be substantially prevented from moving to the heating medium in the low-temperature channel (13).

Also in the second embodiment, adjusting the opening degree of the control valve (60) allows the flow rate of part of the heating medium through the branch channel (50) to be controlled, and in turn, allows the flow rate of the heating medium through a temperature control channel (21) to be controlled.

Specifically, in the heating operation, part of the heating medium in the low-temperature channel (13) flows into the branch channel (50), and further flows into the first internal channel (57) of the cylinder (55). Meanwhile, the suction pressure of a portion of the pump (30) near a second port (36) is applied to the second internal channel (58). Thus, the partitioning member (56) moves toward the high-temperature channel (14), and the volume of the first internal channel (57) increases. This causes the heating medium in the low-temperature channel (13) to be accumulated in the first internal channel (57). Here, the maximum volume Vmax1 of the first internal channel (57) is greater than the amount Vd1 of the heating medium discharged by the pump (30) during the first operation. This allows a sufficient amount of the heating medium in the low-temperature channel (13) to be accumulated in the first internal channel (57). The heating medium in the low-temperature channel (13) is allowed to flow into the branch channel (50) in the foregoing manner to control the flow rate of the heating medium through the temperature control channel (21).

In the cooling operation, part of the heating medium in the high-temperature channel (14) flows into the branch channel (50), and further flows into the second internal channel (58) of the cylinder (55). Meanwhile, the suction pressure of a portion of the pump (30) near a first port (35) is applied to the first internal channel (57). Thus, the partitioning member (56) moves toward the low-temperature channel (13), and the volume of the second internal channel (58) increases. This causes the heating medium in the high-temperature channel (14) to be accumulated in the second internal channel (58). The maximum volume Vmax2 of the second internal channel (58) is greater than the amount Vd2 of the heating medium discharged by the pump (30) during the second operation. This allows a sufficient amount of the heating medium in the high-temperature channel (14) to be accumulated in the second internal channel (58). The heating medium in the high-temperature channel (14) is allowed to flow into the branch channel (50) in the foregoing manner to control the flow rate of the heating medium through the temperature control channel (21).

The first and second internal channels (57) and (58) are separated from each other by the partitioning member (56). This allows the heating medium in the low-temperature channel (13) and the heating medium in the high-temperature channel (14) to be reliably prevented from being mixed together. Accordingly, heat loss resulting from such mixing of these heating media is avoided.

Third Embodiment

Figure 5:
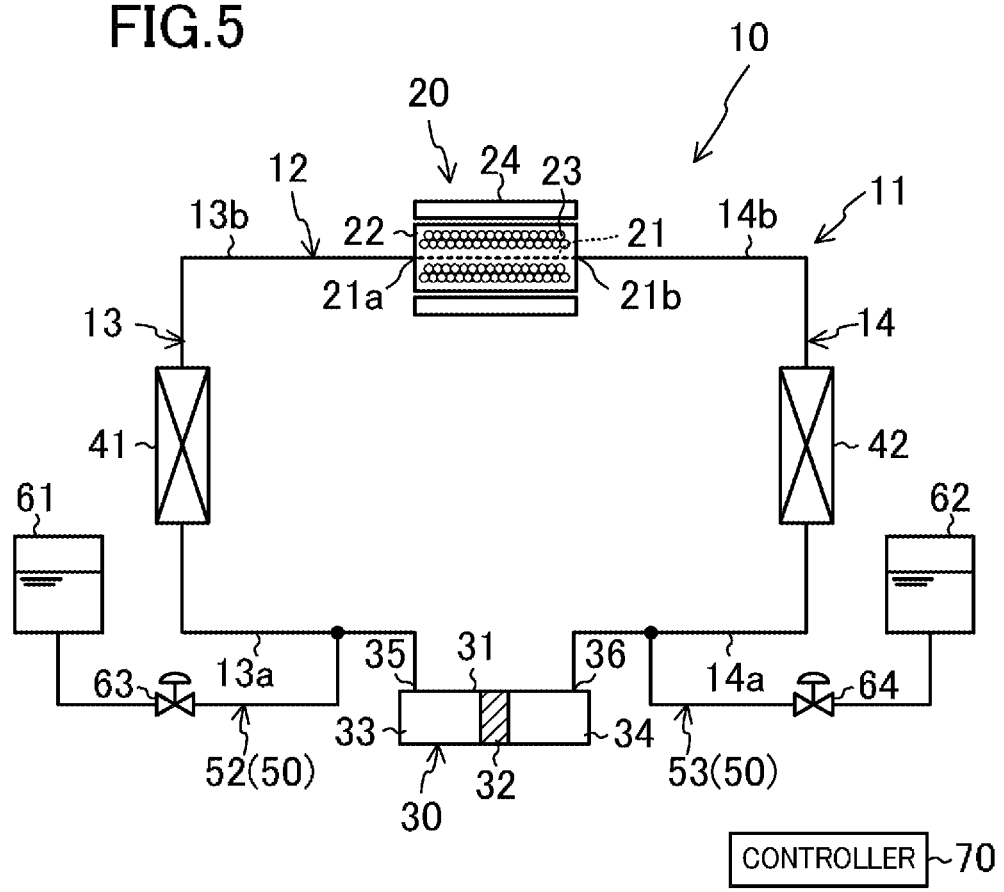
FIG. 5 corresponds to FIG. 1 and illustrates a third embodiment.

As shown in FIG. 5, in a third embodiment, a low-temperature channel (13) and a high-temperature channel (14) are respectively connected to branch channels (52, 53). Specifically, the low-temperature channel (13) is connected to one end of a first branch pipe (52) defining an associated one of the branch channels. The other end of the first branch pipe (52) is connected to a first reservoir (61). The high-temperature channel (14) is connected to one end of a second branch pipe (53) defining another associated one of the branch channels. The other end of the second branch pipe (53) is connected to a second reservoir (62). The first and second reservoirs (61) and (62) are each a container that can store the heating medium. The first and second reservoirs (61) and (62) are each provided with a pressure release valve (not shown). The actual internal volume Vr1 of the first reservoir (61) and the actual internal volume Vr2 of the second reservoir (62) are equal to each other. These actual internal volumes Vr1 and Vr2 are each greater than twice the amount Vd1 or Vd2 of the heating medium discharged by the pump (30) during each of the first and second operations.

The first branch pipe (52) is connected to a first control valve (63) serving as a channel resistance regulator. The second branch pipe (53) is connected to a second control valve (64) serving as a channel resistance regulator. The first and second control valves (63) and (64) are each a motor-operated valve, for example, and each have an adjustable opening degree. A controller (70) adjusts the opening degree of the first control valve (63) during the heating operation, and adjusts the opening degree of the second control valve (64) during the cooling operation.

Specifically, the first control valve (63) opening at a predetermined opening degree during the heating operation allows part of the heating medium in the low-temperature channel (13) to flow into the first branch pipe (52). The heating medium in the first branch pipe (52) is accumulated in the first reservoir (61). The actual volume Vr1 of the first reservoir (61) is greater than twice the amount of the heating medium discharged by the pump (30) during the first or second operation. This allows a sufficient amount of the heating medium to be accumulated in the first reservoir (61). The heating medium in the high-temperature channel (14) is allowed to flow into the branch channel (50) in the foregoing manner to control the flow rate of the heating medium through the temperature control channel (21).

In the heating operation, the heating medium accumulated in the second reservoir (62) is returned to the high-temperature channel (14), and is then sucked into the second port (36) of the pump (30). The actual volume Vr2 of the second reservoir (62) is greater than twice the amount Vd2 of the heating medium discharged by the pump (30) during the first or second operation. This allows the heating medium in the second reservoir (62) to be prevented from being lost.

Subsequently, the second control valve (64) opening at a predetermined opening degree during the cooling operation allows part of the heating medium in the high-temperature channel (14) to flow into the second branch pipe (53). The heating medium in the second branch pipe (53) is accumulated in the second reservoir (62). The actual volume Vr2 of the second reservoir (62) is greater than twice the amount Vd2 of the heating medium discharged by the pump (30) during the second operation. This allows a sufficient amount of the heating medium to be accumulated in the second reservoir (62). The heating medium in the low-temperature channel (13) is allowed to flow into the branch channel (50) in the foregoing manner to control the flow rate of the heating medium through the temperature control channel (21).

In the cooling operation, the heating medium accumulated in the first reservoir (61) is returned to the low-temperature channel (13), and is then sucked into the first port (35) of the pump (30). The actual volume Vr1 of the first reservoir (61) is greater than twice the amount of the heating medium discharged by the pump (30) during the first or second operation. This allows the heating medium in the first reservoir (61) to be prevented from being lost.

Variation

The above-described embodiments may be configured as indicated in the following variations. Note that the first embodiment including features of each of the variations will be exemplified below.

First Variation

Figure 6:
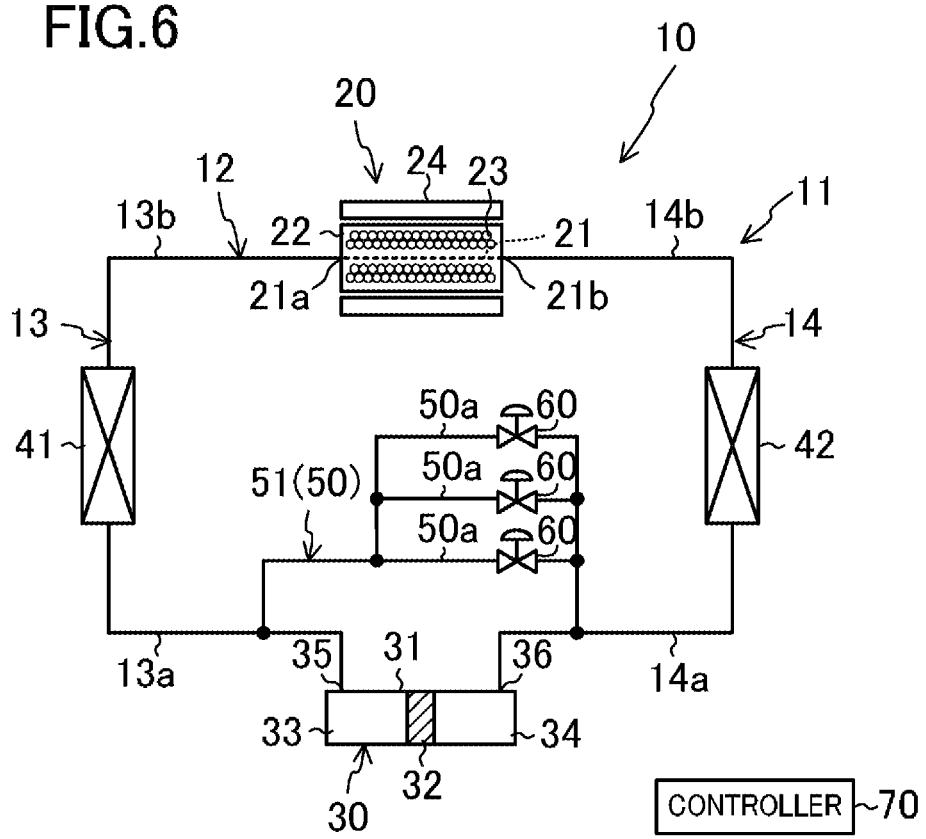
FIG. 6 corresponds to FIG. 1 and illustrates a first variation.

FIG. 6 illustrates a first variation, in which the configurations of a branch channel (50) (intermediate channel (51)) and channel resistance regulators (control valves) are different from those of the first embodiment. The branch channel (50) according to the first variation includes a plurality of parallel pipes (50a, 50a, 50a) connected together in parallel. In this variation, three parallel pipes (50a) are provided for the branch channel (50). The parallel pipes (50a) are connected to respective control valves (60). Each of the control valves (60) of this variation is an electromagnetic on-off valve, for example, and opens and closes an associated one of the parallel pipes (50a). Each control valve (60) forms a channel resistance regulator that regulates the channel resistance of the branch channel (50).

In this variation, the flow rate of a heating medium through a temperature control channel (21) is controlled in response to which of the control valves (60) is/are opened or closed. For example, with the three control valves (60) all closed, the flow rate of the heating medium through the temperature control channel (21) is equivalent to the amount of the heating medium discharged by the pump (30). With one of the three control valves (60) being open, and the remaining control valves (60) being closed, the flow rate of the heating medium through the branch channel (50) increases, and the flow rate of the heating medium through the temperature control channel (21) decreases. With two of the three control valves (60) being open, and the remaining control valve (60) being closed, the flow rate of the heating medium through the branch channel (50) further increases, and the flow rate of the heating medium through the temperature control channel (21) further decreases. As can be seen, in this variation, as the number of open ones of the control valves (60) increases, the flow rate of the heating medium through the branch channel (50) increases.

The parallel pipes (50a) and the control valves (60) according to the first variation may be used for the branch channel (50) of the second or third embodiment.

Second Variation

Figure 7:
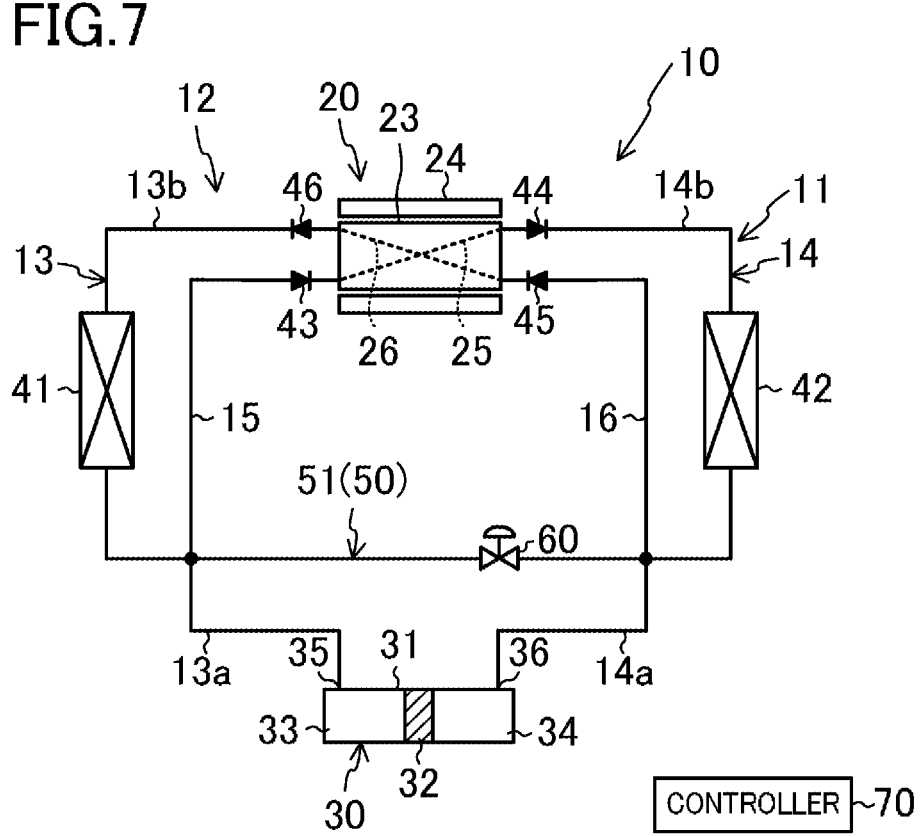
FIG. 7 corresponds to FIG. 1 and illustrates a second variation.

FIG. 7 illustrates a second variation, in which a bed (22) of a single magnetic refrigeration unit (20) has two temperature control channels (a heating channel (25) and a cooling channel (26)). The heating channel (25) allows a heating medium that is about to be transferred to a high-temperature heat exchanger (42) during a heating operation to flow therethrough. The cooling channel (26) allows a heating medium that is about to be transferred to a low-temperature heat exchanger (41) during a cooling operation to flow therethrough.

The inlet end of the heating channel (25) is connected through a low-temperature bypass channel (15) to a first pump-side pipe (13a). The low-temperature bypass channel (15) is connected to a first check valve (43). The first check valve (43) allows the heating medium to flow through the low-temperature bypass channel (15) only toward the heating channel (25), and disallows the heating medium to flow in the reverse direction.

The outlet end of the heating channel (25) is connected through a second magnetic-refrigeration-unit-side pipe (14b) to the high-temperature heat exchanger (42). The second magnetic-refrigeration-unit-side pipe (14b) is connected to a second check valve (44). The second check valve (44) allows the heating medium to flow through the second magnetic-refrigeration-unit-side pipe (14b) only toward the high-temperature heat exchanger (42), and disallows the heating medium to flow in the reverse direction.

The inlet end of the cooling channel (26) is connected through a high-temperature bypass channel (16) to a second pump-side pipe (14a). The high-temperature bypass channel (16) is connected to a third check valve (45). The third check valve (45) allows the heating medium to flow through the high-temperature bypass channel (16) only toward the cooling channel (26), and disallows the heating medium to flow in the reverse direction.

The outlet end of the cooling channel (26) is connected through a first magnetic-refrigeration-unit-side pipe (13b) to the low-temperature heat exchanger (41). The first magnetic-refrigeration-unit-side pipe (13b) is connected to a fourth check valve (46). The fourth check valve (46) allows the heating medium to flow through the first magnetic-refrigeration-unit-side pipe (13b) only toward the low-temperature heat exchanger (41), and disallows the heating medium to flow in the reverse direction.

In the heating operation of the second variation, the heating medium transferred by a pump (30) during the first operation passes through the low-temperature bypass channel (15), and then flows through the heating channel (25). In the heating channel (25), the heating medium is heated by a magnetic working substance (23). The heated heating medium is transferred to the high-temperature heat exchanger (42), and is used to heat the target to be heated. The heating medium in the high-temperature channel (14) is sucked into a second port (36) of the pump (30).

Also in the heating operation of the second variation, part of the heating medium is allowed to flow into the branch channel (50) to control the flow rate of the heating medium through the heating channel (25).

In the cooling operation of the second variation, the heating medium transferred by the pump (30) during the second operation passes through the high-temperature bypass channel (16), and then flows through the cooling channel (26). In the cooling channel (26), the heating medium is cooled by the magnetic working substance (23). The cooled heating medium is transferred to the low-temperature heat exchanger (41), and is used to cool the target to be cooled. The heating medium in the low-temperature channel (13) is sucked into a first port (35) of the pump (30).

Also in the cooling operation of the second variation, part of the heating medium is allowed to flow into the branch channel (50) to control the flow rate of the heating medium through the cooling channel (26).

A heating medium circuit (11) according to the second variation may be used in the second or third embodiment.

Third Variation

Figure 8:
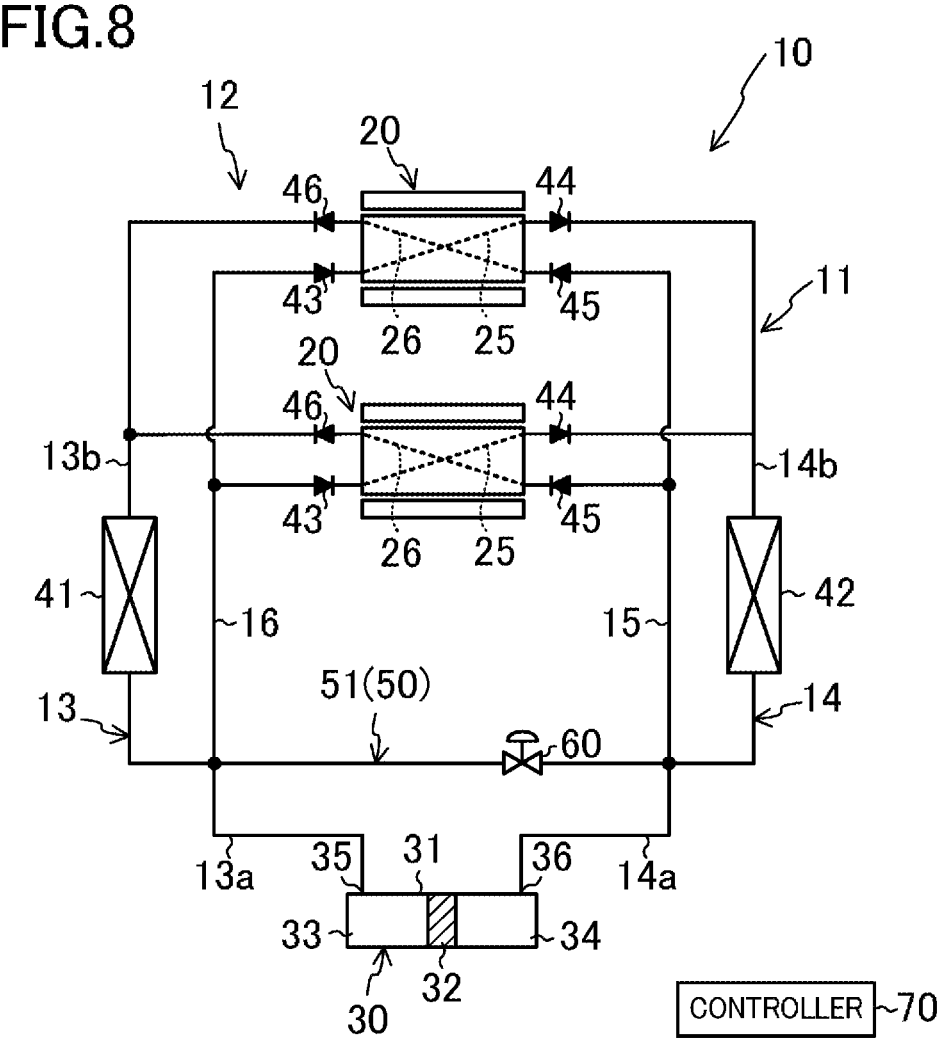
FIG. 8 corresponds to FIG. 1 and illustrates a third variation.

FIG. 8 illustrates a third variation, in which a heating medium circuit (11) similar to that of the second variation includes a plurality of (in this variation, two) magnetic refrigeration units (20) connected together in parallel. Thus, in a heating operation, a heating medium in a low-temperature channel (13) is heated in each of heating channels (25) of the two magnetic refrigeration units (20), and is then transferred to a high-temperature heat exchanger (42). In a cooling operation, the heating medium in a high-temperature channel (14) is cooled in each of cooling channels (26) of the two magnetic refrigeration units (20), and is then transferred to a low-temperature heat exchanger (41). Also in the third variation, controlling the flow rate of the heating medium flowing into the branch channel (50) during the heating operation allows the flow rate of the heating medium through each of the heating channels (25) to be controlled. Controlling the flow rate of the heating medium flowing into the branch channel (50) during the cooling operation allows the flow rate of the heating medium through each of the cooling channels (26) to be controlled.

The heating medium circuit (11) according to the third variation may be used in the second or third embodiment.

Fourth Variation

Figure 9:
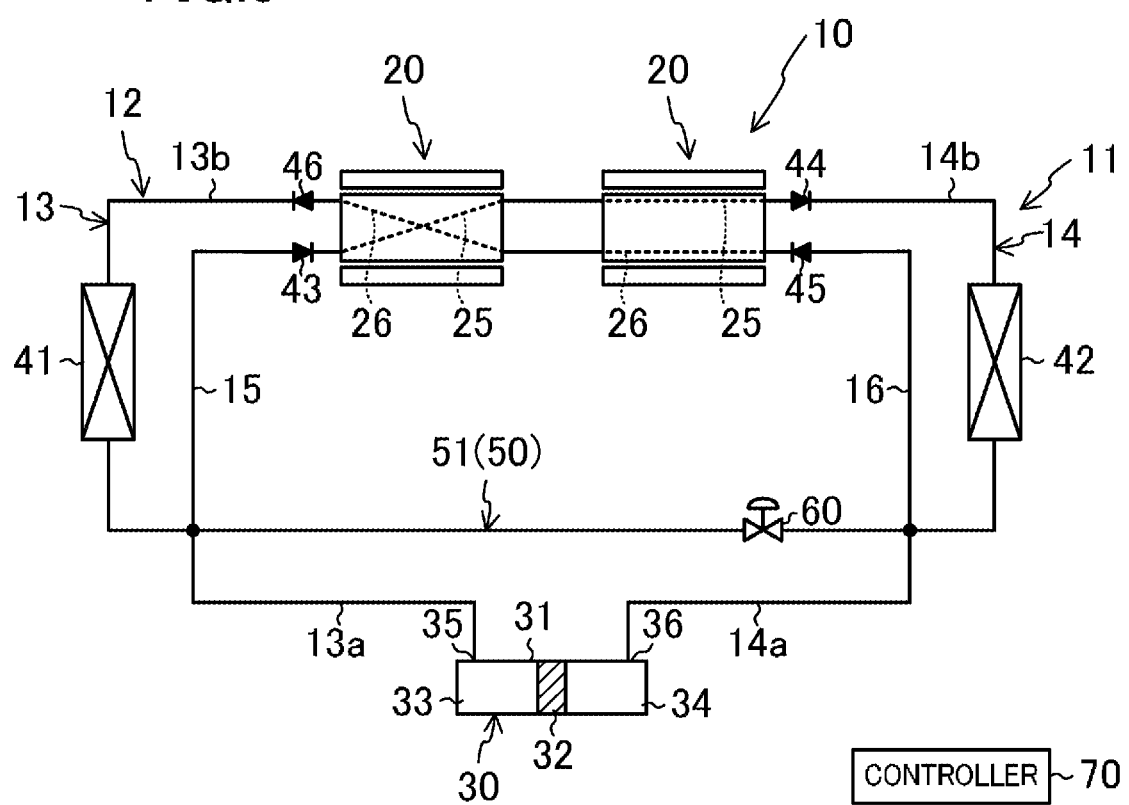
FIG. 9 corresponds to FIG. 1 and illustrates a fourth variation.

FIG. 9 illustrates a fourth variation, in which a heating medium circuit (11) similar to that of the second variation includes a plurality of (in this variation, two) magnetic refrigeration units (20) connected together in series. Thus, in a heating operation, a heating medium in a low-temperature channel (13) is heated in heating channels (25) of the magnetic refrigeration units (20) in sequence, and is then transferred to a high-temperature heat exchanger (42). In a cooling operation, the heating medium in a high-temperature channel (14) is cooled in cooling channels (26) of the magnetic refrigeration units (20) in sequence, and is then transferred to a low-temperature heat exchanger (41). Also in the fourth variation, controlling the flow rate of the heating medium flowing into the branch channel (50) during the heating operation allows the flow rate of the heating medium through each of the heating channels (25) to be controlled. Controlling the flow rate of the heating medium flowing into the branch channel (50) during the cooling operation allows the flow rate of the heating medium through each of the cooling channels (26) to be controlled.

The heating medium circuit (11) according to the fourth variation may be used in the second or third embodiment.

Fourth Embodiment

A magnetic refrigeration apparatus (10) according to this fourth embodiment controls the temperature of a heating medium by means of a magnetocaloric effect. The magnetic refrigeration apparatus (10) is applied to an air conditioner, for example.

Figure 10:
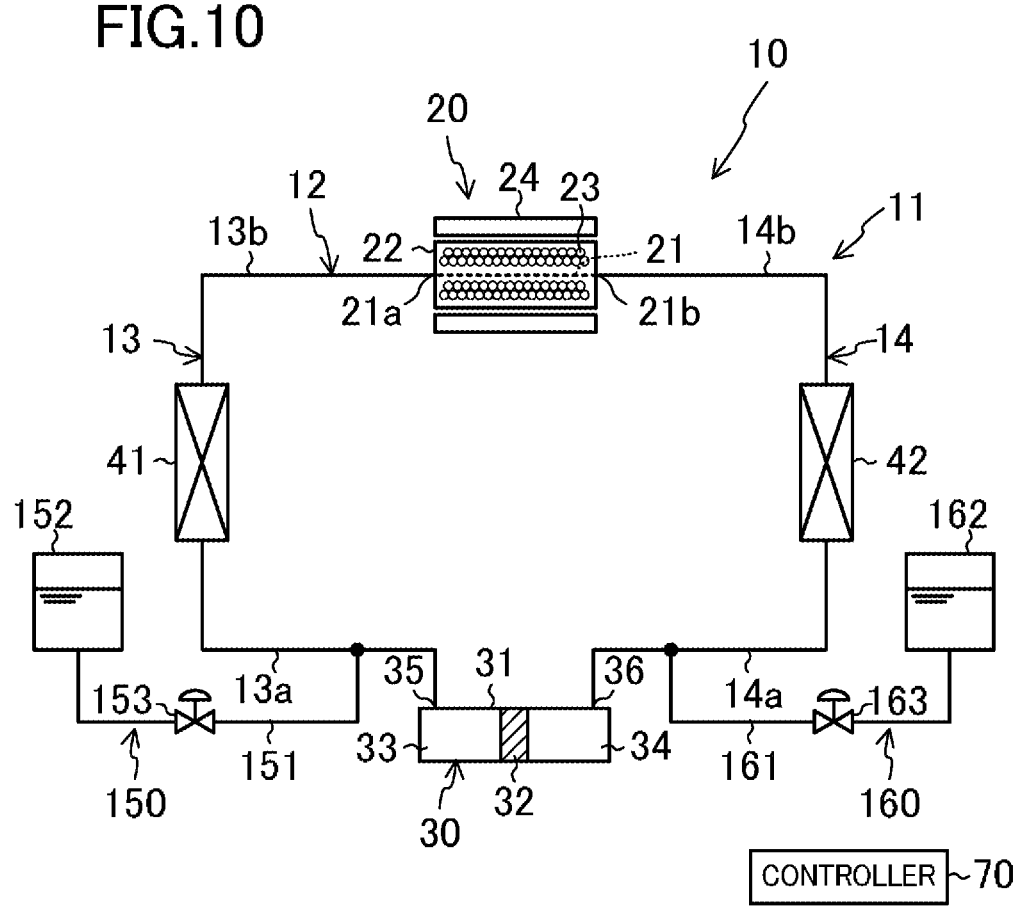
FIG. 10 is a piping system diagram schematically illustrating a configuration of a magnetic refrigeration apparatus according to a fourth embodiment.

As shown in FIG. 10, the magnetic refrigeration apparatus (10) includes a heating medium circuit (11) filled with a heating medium. The components of the heating medium circuit (11) are connected together through pipes. The heating medium circuit (11) has a main channel (12) forming a closed loop, and two branch channels (150, 160) branching from the main channel (12).

The magnetic refrigeration apparatus (10) includes a magnetic refrigeration unit (20) (magnetic refrigerator), a pump (30), a low-temperature heat exchanger (41), and a high-temperature heat exchanger (42). The main channel (12) according to this embodiment is connected to the pump (30), the low-temperature heat exchanger (41), a temperature control channel (21) of the magnetic refrigeration unit (20), and the high-temperature heat exchanger (42) in this order.

The main channel (12) includes a low-temperature channel (13) and a high-temperature channel (14). The low-temperature channel (13) is located between one end of the temperature control channel (21) of the magnetic refrigeration unit (20) and a first port (35) of the pump (30). The low-temperature channel (13) constitutes a first channel. The one end of the temperature control channel (21) constitutes a first connecting port (21a). The high-temperature channel (14) is located between the other end of the temperature control channel (21) of the magnetic refrigeration unit (20) and a second port (36) of the pump (30). The high-temperature channel (14) constitutes a second channel. The other end of the temperature control channel (21) constitutes a second connecting port (21b). The low-temperature channel (13) may be a second channel, and the high-temperature channel (14) may be a first channel.

The low-temperature channel (13) includes a first pump-side pipe (13a) located between the low-temperature heat exchanger (41) and the pump (30), and a first magnetic-refrigeration-unit-side pipe (13b) located between the low-temperature heat exchanger (41) and the magnetic refrigeration unit (20). The high-temperature channel (14) includes a second pump-side pipe (14a) located between the high-temperature heat exchanger (42) and the pump (30), and a second magnetic-refrigeration-unit-side pipe (14b) located between the high-temperature heat exchanger (42) and the magnetic refrigerator (20).

Pump

The pump (30) according to this embodiment constitutes a fluid transfer mechanism that makes the heating medium in the main channel (12) flow reciprocally. Specifically, the pump (30) alternately repeats first and second operations. In the first operation, the pump (30) transfers the heating medium in the main channel (12) in a first direction (a direction indicated by a solid arrow in FIG. 11). In the second operation, the pump (30) transfers the heating medium in the main channel (12) in a second direction (a direction indicated by a solid arrow in FIG. 12) opposite to the first direction.

The pump (30) according to this embodiment is a reciprocating piston pump. The pump (30) includes a pump casing (31), and a piston (32) disposed to be movable forward and backward through the pump casing (31). The piston (32) partitions the interior of the pump casing (31) into a first chamber (33) and a second chamber (34). The pump casing (31) has a first port (35) communicating with the first chamber (33), and a second port (36) communicating with the second chamber (34). The first port (35) is connected to the low-temperature channel (13), and the second port (36) is connected to the high-temperature channel (14).

The piston (32) is driven by a driving mechanism (not shown). The driving mechanism includes, for example, a rod coupled to the piston (32), a crank coupled to the rod, and an electric motor that drives the crank. In response to the rotation of the crank by the electric motor, the rod moves forward and backward. This allows the piston (32) to reciprocate through the pump casing (31). As a result, the first and second operations are alternately repeated.

In the first operation, the piston (32) moves toward the first port (35). Thus, the volume of the first chamber (33) decreases, and the volume of the second chamber (34) increases. The heating medium in the first chamber (33) therefore is discharged through the first port (35) to the low-temperature channel (13). Meanwhile, the heating medium in the high-temperature channel (14) is sucked through the second port (36) into the second chamber (34).

In the second operation, the piston (32) moves toward the second port (36). Thus, the volume of the second chamber (34) decreases, and the volume of the first chamber (33) increases. The heating medium in the second chamber (34) therefore is discharged through the second port (36) to the high-temperature channel (14). Meanwhile, the heating medium in the low-temperature channel (13) is sucked through the first port (35) into the first chamber (33).

Low-Temperature Heat Exchanger/High-Temperature Heat Exchanger

The low-temperature heat exchanger (41) exchanges heat between the heating medium cooled in the magnetic refrigeration unit (20) and a predetermined target to be cooled (e.g., a secondary refrigerant or air). The high-temperature heat exchanger (42) exchanges heat between the heating medium heated in the magnetic refrigeration unit (20) and a predetermined target to be heated (e.g., a secondary refrigerant or air).

Magnetic Refrigeration Unit

The magnetic refrigeration unit (20) includes a bed (22), a magnetic working substance (23) disposed in the temperature control channel (21) in the bed (22), and a magnetic field modulator (24) that applies a magnetic field variation to the magnetic working substance (23). The bed (22) is a hollow casing or column, and its interior is filled with the magnetic working substance (23). The magnetic working substance (23) has the property of generating heat when a magnetic field is applied thereto or when the magnetic field applied thereto is intensified, and absorbing heat when the magnetic field is removed therefrom or when the magnetic field applied thereto is weakened. Examples of the material of the magnetic working substance (23) include $Gd_5(Ge_{0.5}Si_{0.5})_4$, $La(Fe_{1-x}Si_x)_{13}$, $La(Fe_{1-x}Co_xSi_y)_{13}$, $La(Fe_{1-x}Si_x)_{13}H_y$, and $Mn(As_{0.9}Sb_{0.1})$.

The magnetic field modulator (24) controls the intensity of the magnetic field applied to the magnetic working substance (23). The magnetic field modulator (24) is comprised of an electromagnet capable of modulating a magnetic field, for example. The magnetic field modulator (24) performs a first modulation operation of applying a magnetic field to the magnetic working substance (23) or intensifying the magnetic field applied, and a second modulation operation of removing the magnetic field applied to the magnetic working substance (23), or weakening the magnetic field applied.

Branch Channel

The heating medium circuit (11) is connected to a first branch channel (150) and a second branch channel (160). The first branch channel (150) is connected to the low-temperature channel (13). The second branch channel (160) is connected to the high-temperature channel (14).

The first branch channel (150) includes a third branch pipe (151) and a first accumulator (152). One end of the third branch pipe (151) is connected to the first pump-side pipe (13a) of the low-temperature channel (13). The first accumulator (152) is connected to the other end of the third branch pipe (151). The first accumulator (152) forms a container into/out of which the heating medium can flow. The third branch pipe (151) is connected to a third control valve (153). The third control valve (153) is an electromagnetic on-off valve, for example. In other words, the third control valve (153) is switched between a closed state where the first branch channel (150) is closed and an open state where the first branch channel (150) is open.

The second branch channel (160) includes a fourth branch pipe (161) and a second accumulator (162). One end of the fourth branch pipe (161) is connected to the second pump-side pipe (14a) of the high-temperature channel (14). The second accumulator (162) is connected to the other end of the fourth branch pipe (161). The second accumulator (162) forms a container into/out of which the heating medium can flow. The fourth branch pipe (161) is connected to a fourth control valve (163). The fourth control valve (163) is an electromagnetic on-off valve, for example. In other words, the fourth control valve (163) is switched between a closed state where the second branch channel (160) is closed and an open state where the second branch channel (160) is open.

Controller

The magnetic refrigeration apparatus (10) includes a controller (70) configured to control the third and fourth control valves (153) and (163). The controller (70) includes a microcomputer and a memory device storing software for operating the microcomputer (specifically, a semiconductor memory).

The controller (70) according to this embodiment controls the third and fourth control valves (153) and (163) in synchronization with the first and second operations, respectively. Specifically, in response to the execution of the first operation, the controller (70) places the third control valve (153) on the discharge side of the pump (30) in the closed state. In addition, in response to the execution of the first operation, the controller (70) places the fourth control valve (163) on the suction side of the pump (30) in the open state. On the other hand, in response to the execution of the second operation, the controller (70) places the fourth control valve (163) on the discharge side of the pump (30) in the closed state. In addition, in response to the execution of the second operation, the controller (70) places the third control valve (153) on the suction side of the pump (30) in the open state (see FIG. 13, this will be described in detail below).

Operation of Magnetic Refrigeration Apparatus

First, how the magnetic refrigeration apparatus (10) basically operates is described below. The magnetic refrigeration apparatus (10) alternately repeats a heating operation shown in FIG. 11 and a cooling operation shown in FIG. 12. The interval at which switching is made between the heating and cooling operations is set to be about one second.

Heating Operation

In the heating operation, the pump (30) performs the first operation, and the magnetic field modulator (24) performs the first modulation operation. In other words, in the heating operation, the heating medium is discharged through the first port (35) of the pump (30). Meanwhile, a magnetic field is applied to the magnetic working substance (23). Alternatively, the magnetic field applied is intensified.

When the heating medium is discharged from the first chamber (33) of the pump (30) to the low-temperature channel (13), the heating medium in the low-temperature channel (13) flows into the first connecting port (21a) of the temperature control channel (21) of the magnetic refrigeration unit (20). In the magnetic refrigeration unit (20) during the first modulation operation, heat is radiated from the magnetic working substance (23) toward its surrounding area. Thus, the heating medium flowing through the temperature control channel (21) is heated by the magnetic working substance (23). The heating medium heated in the temperature control channel (21) flows out of the second connecting port (21b) to the high-temperature channel (14), and flows through the high-temperature heat exchanger (42). The high-temperature heat exchanger (42) heats a predetermined target to be heated (e.g., a secondary refrigerant or air) using the high-temperature heating medium. The heating medium in the high-temperature channel (14) is sucked through the second port (36) of the pump (30) into the second chamber (34).

Cooling Operation

In the cooling operation, the pump (30) performs the second operation, and the magnetic field modulator (24) performs the second modulation operation. In other words, in the heating operation, the heating medium is discharged through the second port (36) of the pump (30). Meanwhile, a magnetic field is removed from the magnetic working substance (23). Alternatively, the magnetic field applied is weakened.

When the heating medium is discharged from the second chamber (34) of the pump (30) to the high-temperature channel (14), the heating medium in the high-temperature channel (14) flows into the second connecting port (21b) of the temperature control channel (21) of the magnetic refrigeration unit (20). In the magnetic refrigeration unit (20) during the second modulation operation, the magnetic working substance (23) absorbs heat from its surrounding area. Thus, the heating medium flowing through the temperature control channel (21) is cooled by the magnetic working substance (23). The heating medium cooled in the temperature control channel (21) flows out of the first connecting port (21a) to the low-temperature channel (13), and flows through the low-temperature heat exchanger (41). The low-temperature heat exchanger (41) cools a predetermined target to be cooled (e.g., a secondary refrigerant or air) using the low-temperature heating medium. The heating medium in the low-temperature channel (13) is sucked through the first port (35) of the pump (30) into the first chamber (33).

Control Operation for Control Valves

In the above-described heating and cooling operations, the third control valve (153) of the first branch channel (150) and the fourth control valve (163) of the second branch channel (160) are appropriately controlled. This control operation will be described in detail with reference to FIGS. 11 to 13.

Figure 13:
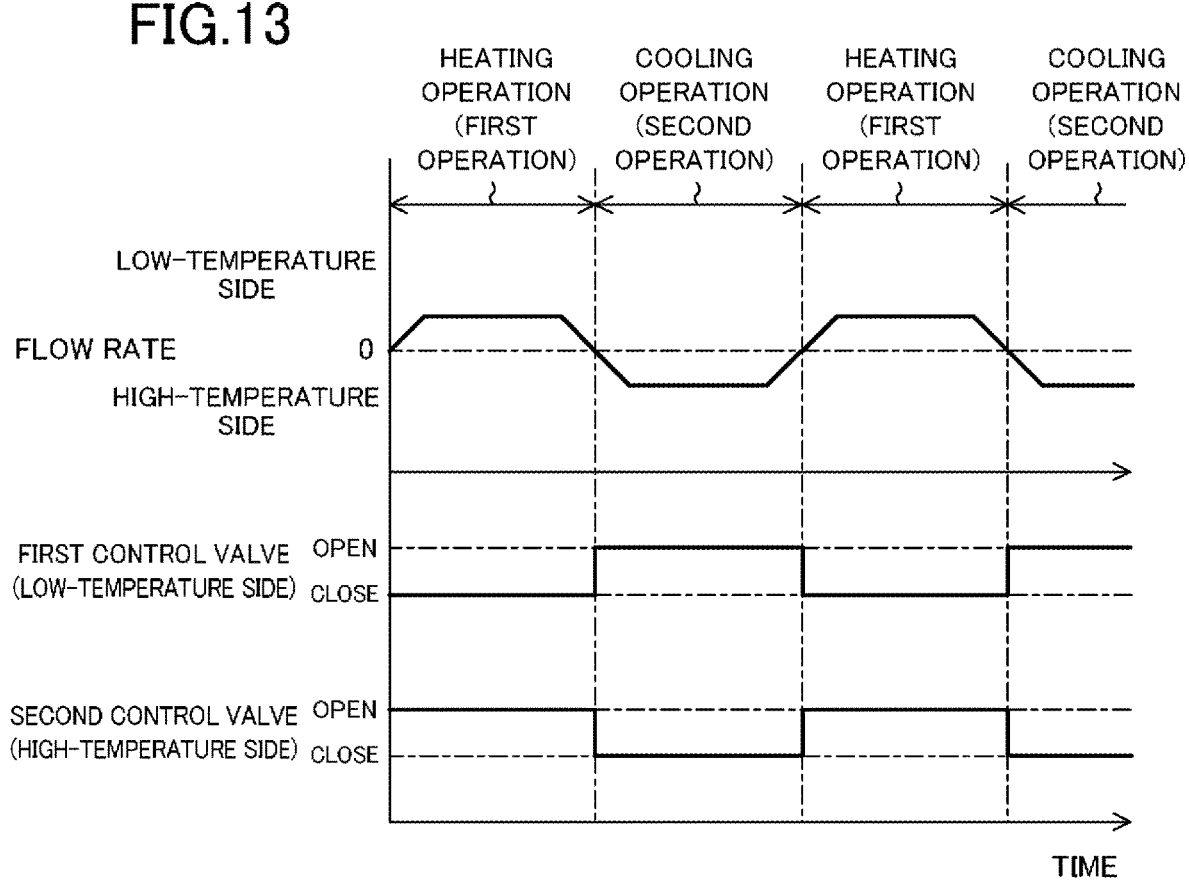
FIG. 13 is a timing chart illustrating time points associated with the flow rate and first and second control valves during a control operation according to the fourth embodiment.

In the fourth embodiment, the third and fourth control valves (153) and (163) are controlled in synchronization with the first and second operations, respectively. In other words, the third and fourth control valves (153) and (163) are controlled in synchronization with the heating and cooling operations, respectively. As shown in FIG. 13, while the first operation or the heating operation is being performed, the third control valve (153) is closed, and the fourth control valve (163) is open. While the second operation or the cooling operation is being performed, the third control valve (153) is open, and the fourth control valve (163) is closed.

Figure 11:
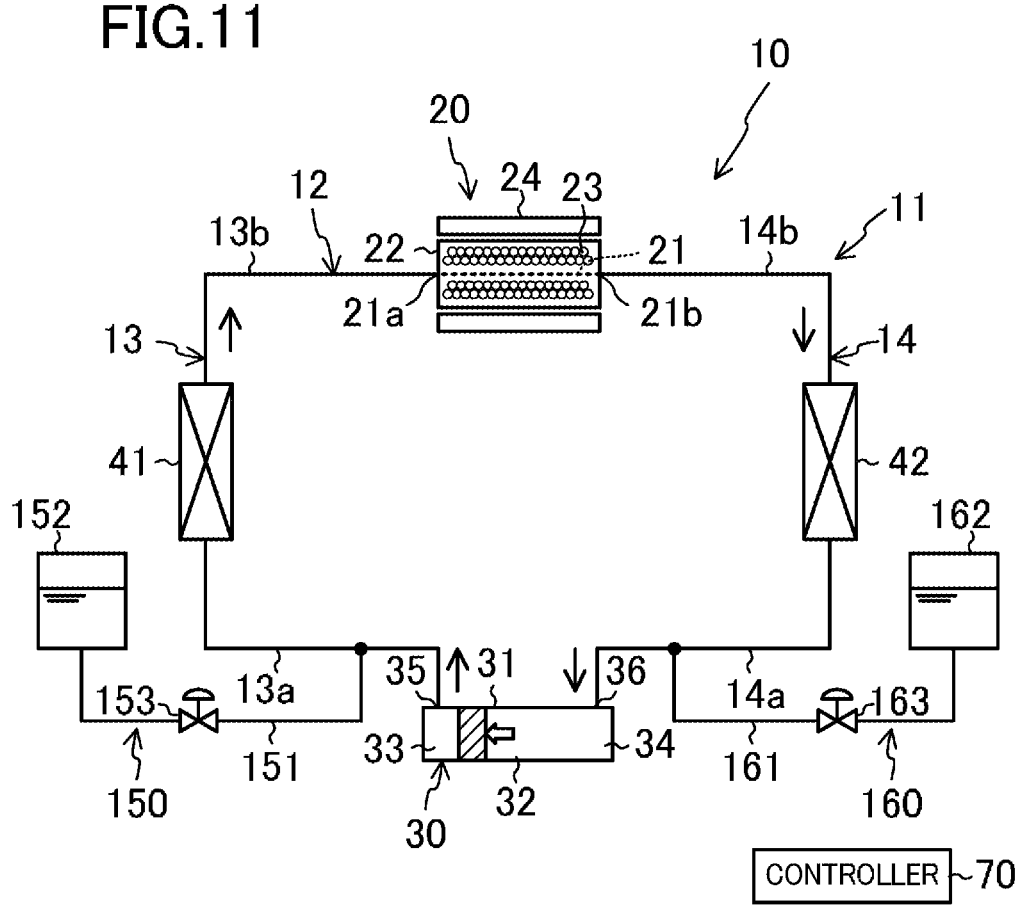
FIG. 11 is a piping system diagram schematically illustrating the configuration of the magnetic refrigeration apparatus according to the fourth embodiment, and further illustrates the flow of a heating medium during a heating operation.

In response to the execution of the heating operation shown in FIG. 11, the third control valve (153) is closed. This prevents the heating medium discharged from the first port (35) of the pump (30) during the first operation from flowing through the first branch channel (150). Thus, the heating medium in the low-temperature channel (13) is supplied to the temperature control channel (21) without being sent to the first branch channel (150). This allows prevention of the reduction in the flow rate of the heating medium flowing through the temperature control channel (21), thereby supplying the heating medium to the high-temperature heat exchanger (42) at a sufficient flow rate. The high-temperature heat exchanger (42) therefore can reliably provide high heating capacity.

In the heating operation, the fourth control valve (163) is placed in the open state. Thus, the heating medium in the second accumulator (162) is sucked into the second port (36) of the pump (30) during the first operation. This allows the pressure of the heating medium on the suction side of the pump (30) (near the second port (36)) to be prevented from being lower than the saturated vapor pressure of the heating medium. Cavitation therefore can be prevented from occurring in a portion of the high-temperature channel (14) near the second port (36).

Figure 12:
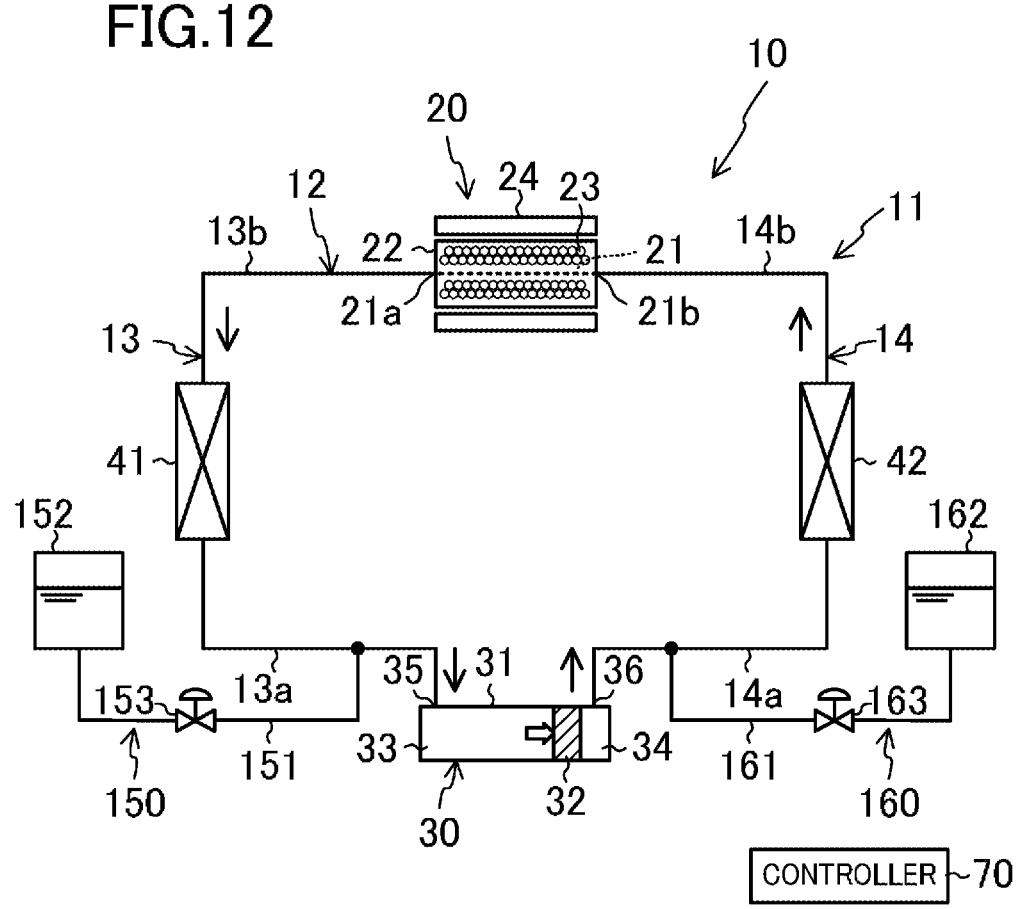
FIG. 12 is a piping system diagram schematically illustrating the configuration of the magnetic refrigeration apparatus according to the fourth embodiment, and further illustrates the flow of the heating medium during a cooling operation.

In response to the execution of the cooling operation shown in FIG. 12, the fourth control valve (163) is closed. This prevents the heating medium discharged from the second port (36) of the pump (30) during the second operation from flowing through the second branch channel (160). Thus, the heating medium in the high-temperature channel (14) is supplied to the temperature control channel (21) without being transferred to the second branch channel (160). This allows prevention of the reduction in the flow rate of the heating medium through the temperature control channel (21), thereby supplying the heating medium to the low-temperature heat exchanger (41) at a sufficient flow rate. The low-temperature heat exchanger (41) therefore can reliably provide high cooling capacity.

In the cooling operation, the third control valve (153) is placed in the open state. Thus, the heating medium in the first accumulator (152) is sucked into the first port (35) of the pump (30) during the second operation. This allows the pressure of the heating medium on the suction side of the pump (30) (near the first port (35)) to be prevented from being lower than the saturated vapor pressure of the heating medium. Cavitation therefore can be prevented from occurring in a portion of the low-temperature channel (13) near the first port (35).

Advantages of Fourth Embodiment

In the fourth embodiment, during the first operation, the fourth control valve (163) placed in the open state allows the pressure on the suction side of the pump (30) to be controlled. During the second operation, the third control valve (153) placed in the open state allows the pressure on the suction side of the pump (30) to be controlled.

In a magnetic refrigeration apparatus, both ends of a fluid transfer mechanism that reciprocally transfers a heating medium may be connected to the respective branch channels (each including an accumulator) to prevent the reduction in the pressure on the suction side of the fluid transfer mechanism in each of two operations decreases. However, this configuration causes part of the heating medium discharged from the fluid transfer mechanism in each of the operations to flow into the associated branch channel. This reduces the flow rate of the heating medium flowing around the magnetic working substance, and degrades the performance of the magnetic refrigeration apparatus.

By contrast, in the fourth embodiment, during the first operation, the third control valve (153) of the first branch channel (150) corresponding to the discharge side of the pump (30) is closed, and during the second operation, the fourth control valve (163) of the second branch channel (160) corresponding to the discharge side of the pump (30) is closed. This allows, in both of the first and second operations, the flow of the heating medium to be prevented from dividing into the branch channels (150, 160), thereby supplying the heating medium to the temperature control channel (21) at a sufficient flow rate. Therefore the high-temperature heat exchanger (42) can reliably provide high heating capacity, and the low-temperature heat exchanger (41) can reliably provide high cooling capacity.

In the fourth embodiment, during the first operation, the fourth control valve (163) of the second branch channel (160) corresponding to the suction side of the pump (30) is opened, and during the second operation, the third control valve (153) of the first branch channel (150) corresponding to the suction side of the pump (30) is opened. This allows the pressure on the suction side of the pump (30) to be prevented from decreasing excessively in both of the first and second operations, and, in turn, cavitation to be prevented from occurring.

In particular, the first and second branch channels (150) and (160) are respectively connected to the accumulators (152, 162) each having a certain volume. This allows sufficient prevention of the reduction in the pressure on the suction side of the pump (30).

In the fourth embodiment, the controller (70) controls the third and fourth control valves (153) and (163) in synchronization with the first and second operations, respectively. Thus, during the first operation, the third control valve (153) is reliably closed, and the fourth control valve (163) can be opened. During the second operation, the fourth control valve (163) is reliably closed, and the third control valve (153) can be opened.

Fifth Embodiment

Figure 14:
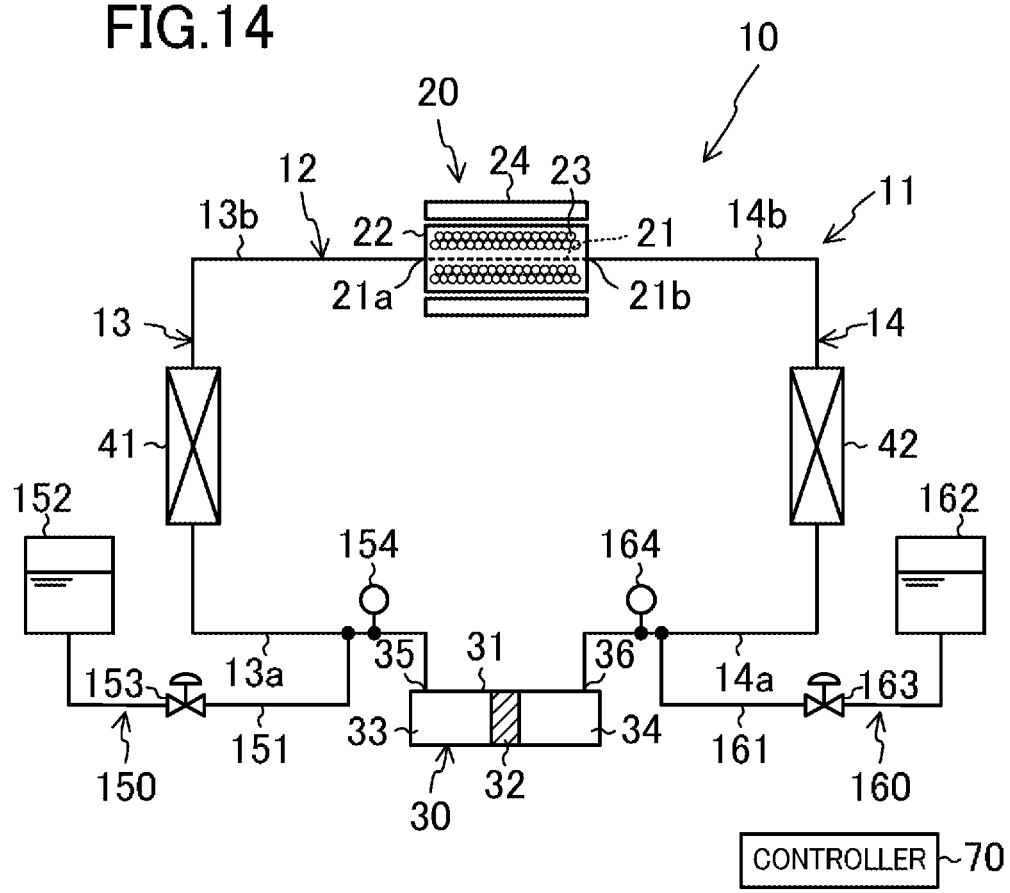
FIG. 14 corresponds to FIG. 10 and illustrates a fifth embodiment.

As shown in FIG. 14, a heating medium circuit (11) of a magnetic refrigeration apparatus (10) according to a fifth embodiment is connected to first and second pressure sensors (154) and (164).

The first pressure sensor (154) is connected to a first pump-side pipe (13*a*). Specifically, the first pressure sensor (154) detects a pressure (a first pressure (P1)) between a first port (35) of a pump (30) and a basal end of a first branch channel (150). The first pressure sensor (154) may be provided at any other location along the heating medium circuit (11) as long as the first pressure sensor (154) can detect a pressure corresponding to the pressure between the pump (30) and the basal end of the first branch channel (150). Specifically, the first pressure sensor (154) may be provided, for example, on a portion of the first branch channel (150) between a third control valve (153) and a low-temperature channel (13) or on a portion of the low-temperature channel (13) between a low-temperature heat exchanger (41) and the basal end of the first branch channel (150).

The second pressure sensor (164) is connected to a second pump-side pipe (14*a*). Specifically, the second pressure sensor (164) detects a pressure (a second pressure (P2)) between a second port (36) of the pump (30) and a basal end of a second branch channel (160). The second pressure sensor (164) detects the pressure (the second pressure (P2)) between the pump (30) and the basal end of the second branch channel (160). The second pressure sensor (164) may be provided at any other location along the heating medium circuit (11) as long as the second pressure sensor (164) can detect the pressure between the pump (30) and the basal end of the second branch channel (160). Specifically, the second pressure sensor (164) may be provided, for example, on a portion of the second branch channel (160) between a fourth control valve (163) and a high-temperature channel (14) or on a portion of the high-temperature channel (14) between a high-temperature heat exchanger (42) and the basal end of the second branch channel (160).

In the fifth embodiment, the controller (70) controls the third control valve (153) based on the first pressure (P1) detected by the first pressure sensor (154). Specifically, when the first pressure (P1) becomes higher than a set value (Ps), the controller (70) closes the third control valve (153) of the first branch channel (150) corresponding to the first pressure sensor (154). When the first pressure (P1) becomes equal to or lower than the set value (Ps), the controller (70) opens the third control valve (153) of the first branch channel (150) corresponding to the first pressure sensor (154). In other words, in this example, a first value for use to determine whether the third control valve (153) should be closed and a second value for use to determine whether the third control valve (153) should be opened are the same set value (Ps). The set value (Ps) corresponds to the saturated vapor pressure of the heating medium, and can be defined as the lowest pressure at which cavitation may occur.

Likewise, the controller (70) controls the fourth control valve (163) based on the second pressure (P2) detected by the second pressure sensor (164). Specifically, when the second pressure (P2) becomes higher than the set value (Ps), the controller (70) closes the fourth control valve (163) of the second branch channel (160) corresponding to the second pressure sensor (164). When the second pressure (P2) becomes equal to or lower than the set value (Ps), the controller (70) opens the fourth control valve (163) of the second branch channel (160) corresponding to the second pressure sensor (164). In other words, in this example, a first value for use to determine whether the fourth control valve (163) should be closed and a second value for use to determine whether the fourth control valve (163) should be opened are the same set value (Ps). In addition, the set value (Ps) for use to control the third control valve (153) and the set value (Ps) for use to control the fourth control valve (163) are also equal to each other. The set value (Ps) corresponds to the saturated vapor pressure of the heating medium, and can be defined as the lowest pressure at which cavitation may occur. Note that the set value (Ps) may be set to be somewhat higher than the saturated vapor pressure.

Figure 15:
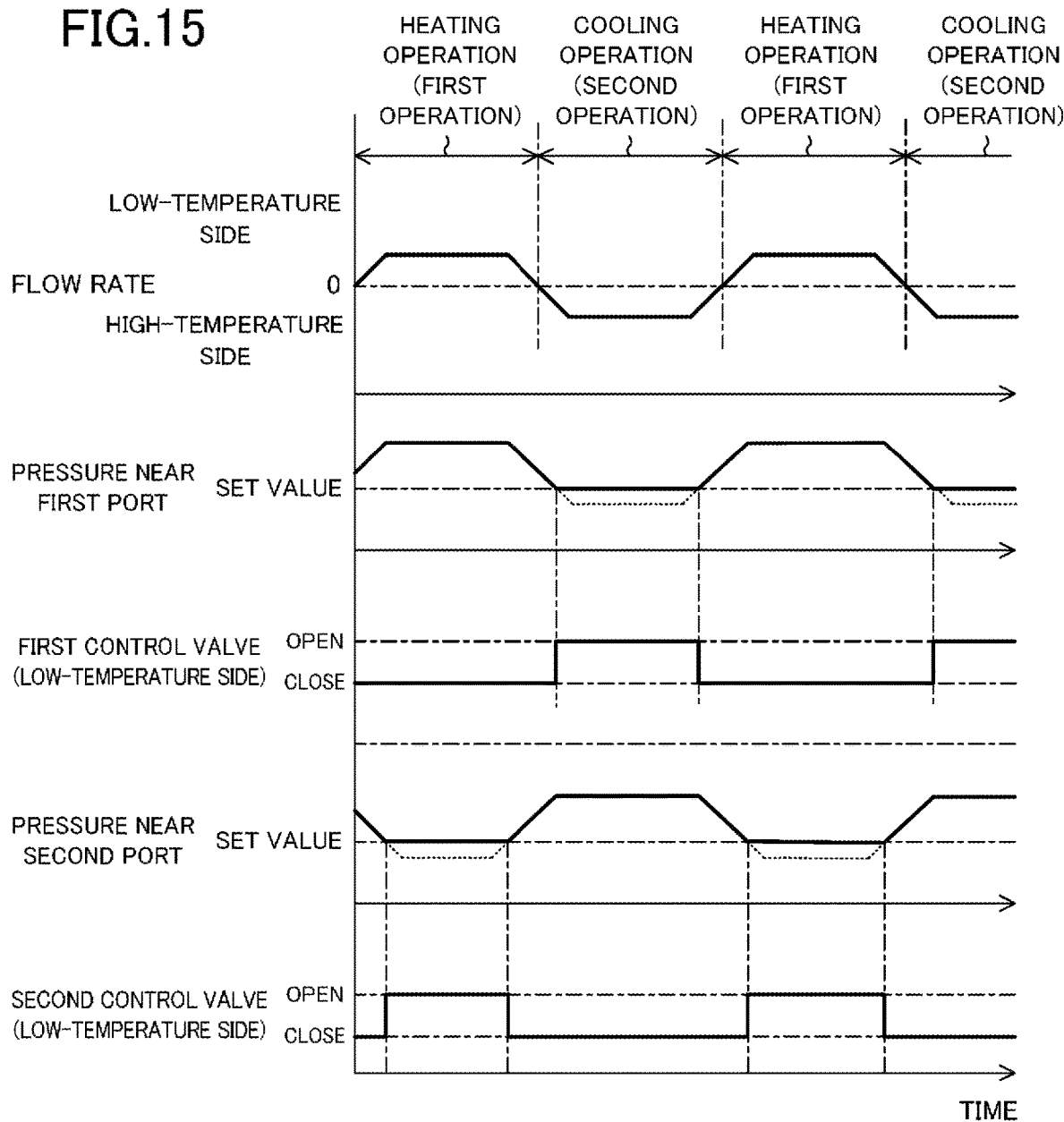
FIG. 15 is a timing chart illustrating time points associated with the flow rate and first and second control valves during a control operation according to the fifth embodiment.

As shown in FIG. 15, in the heating operation, the heating medium is discharged through the first port (35) of the pump (30), and the pressure of the first pump-side pipe (13a) (the pressure near the first port (35)) is thus relatively high. Thus, the first pressure (P1) detected by the first pressure sensor (154) is higher than the set value (Ps). This allows the third control valve (153) to be closed. The heating medium discharged from the first port (35) of the pump (30) therefore can be prevented from flowing into the first branch channel (150).

Meanwhile, in the heating operation, the heating medium is sucked into the second port (36) of the pump (30), and the pressure of the second pump-side pipe (14a) (the pressure near the second port (36)) is thus relatively low. When the second pressure (P2) becomes equal to or lower than the set value (Ps), the fourth control valve (163) is open. The heating medium in a second accumulator (162) therefore is sucked into the second port (36). This allows the pressure near the second port (36) to be prevented from being below the set value (Ps) (i.e., the saturated vapor pressure) as schematically indicated by associated ones of broken lines in FIG. 15.

In the cooling operation, the heating medium is discharged through the second port (36) of the pump (30), and the pressure of the second pump-side pipe (14a) (the pressure near the second port (36)) is thus relatively high. Thus, the second pressure (P2) detected by the second pressure sensor (164) is higher than the set value (Ps). This allows the fourth control valve (163) to be closed. The heating medium discharged from the second port (36) of the pump (30) therefore can be prevented from flowing into the second branch channel (160).

Meanwhile, in the cooling operation, the heating medium is sucked into the first port (35) of the pump (30), and the pressure of the first pump-side pipe (13a) (the pressure near the first port (35)) is thus relatively low. When the first pressure (P1) becomes equal to or lower than the set value (Ps), the third control valve (153) is open. The heating medium in a first accumulator (152) therefore is sucked into the first port (35). This allows the pressure near the first port (35) to be prevented from being below the set value (Ps) (i.e., the saturated vapor pressure) as schematically indicated by other associated ones of the broken lines in FIG. 15.

As can be seen from the foregoing description, in the fifth embodiment, the discharge pressure of the pump (30) is used to determine whether the control valve (153) on the discharge side of the pump (30) should be closed. This allows the heating medium on the discharge side of the pump (30) to be reliably prevented from flowing into the associated branch channel (150, 160).

In the fifth embodiment, when the suction pressure of the pump (30) becomes equal to or lower than the saturated vapor pressure, the associated control valve (153, 163) is opened. This can reliably reduce cavitation.

Sixth Embodiment

In a sixth embodiment, the configuration of a controller (70) is different from that of the fifth embodiment. A first set value (Ps1) and a second set value (Ps2) are set for the controller (70) according to the sixth embodiment. The first set value (Ps1) is a first value for use to determine whether third and fourth control valves (153) and (163) should be closed. The second set value (Ps2) is a second value for use to determine whether the third and fourth control valves (153) and (163) should be opened. The first set value (Ps1) is set to be greater than the second set value (Ps2) by a predetermined value.

Figure 16:
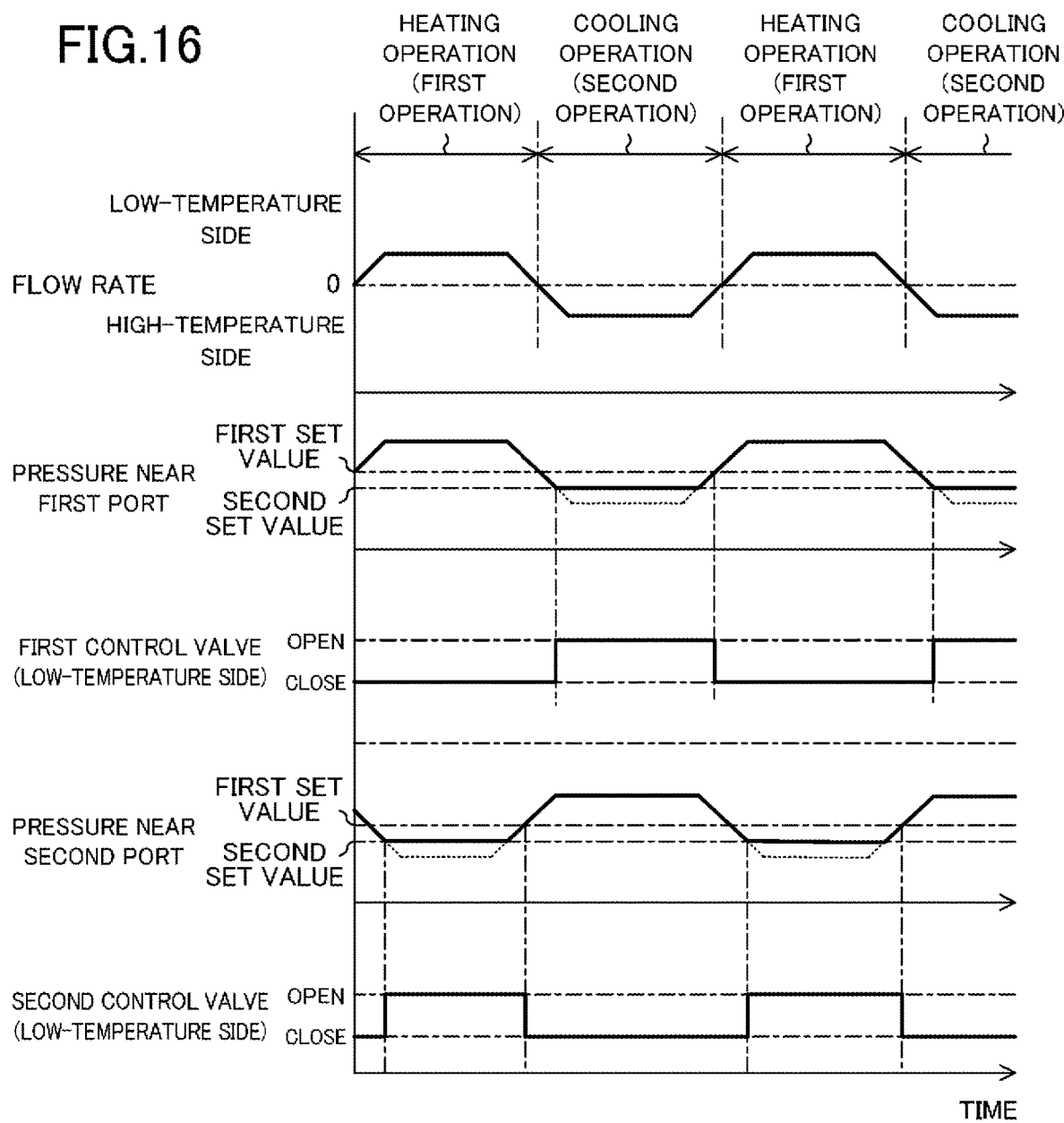
FIG. 16 is a timing chart illustrating time points associated with the flow rate and first and second control valves during a control operation according to a sixth embodiment.

As shown in FIG. 16, when a first pressure (P1) detected by a first pressure sensor (154) becomes higher than the first set value (Ps1), the controller (70) closes the third control valve (153) corresponding to the first pressure sensor (154). When the first pressure (P1) becomes equal to or lower than the second set value (Ps2), the controller (70) opens the third control valve (153) corresponding to the first pressure sensor (154). When a second pressure (P2) detected by a second pressure sensor (164) is higher than the first set value (Ps1), the controller (70) closes the fourth control valve (163) corresponding to the second pressure sensor (164). When the second pressure (P2) becomes equal to or lower than the second set value (Ps2), the controller (70) opens the fourth control valve (163) corresponding to the second pressure sensor (164).

As can be seen from the foregoing description, in the sixth embodiment, the set value for controlling whether the control valves (153, 163) are opened or closed provides hysteresis. This allows reduction in so-called chattering, in which false detection of the pressure sensors (154, 164), slight pressure fluctuations, or any other factor causes the control valves (153, 163) to be repeatedly opened and closed.

Seventh Embodiment

Figure 17:
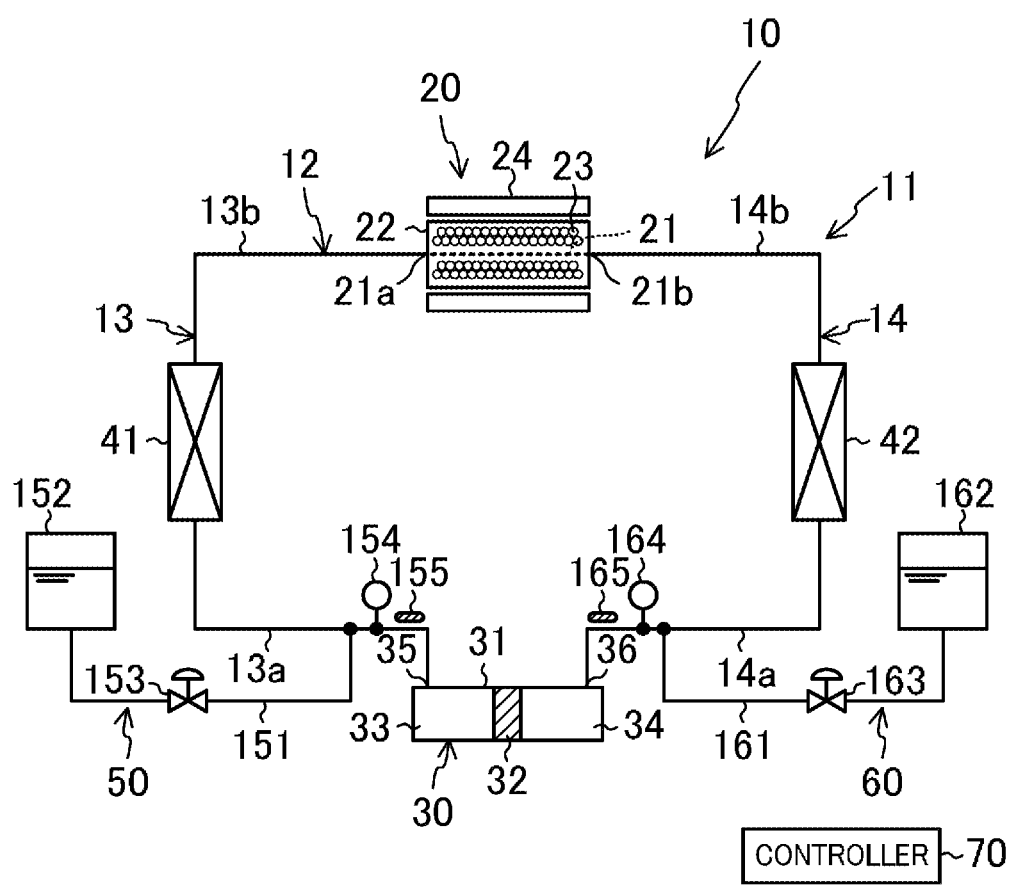
FIG. 17 corresponds to FIG. 10 and illustrates a seventh embodiment.

As shown in FIG. 17, a heating medium circuit (11) of a magnetic refrigeration apparatus (10) according to a seventh embodiment is similar to that of the fifth embodiment, and is connected to first and second temperature sensors (155) and (165).

The first temperature sensor (155) is connected to a first pump-side pipe (13a). Specifically, the first temperature sensor (155) detects a temperature (a first temperature (T1)) between a first port (35) of a pump (30) and a basal end of a first branch channel (150). The first temperature sensor (155) may be provided at any other location along the heating medium circuit (11) as long as the first temperature sensor (155) can detect a temperature corresponding to the temperature between the pump (30) and the basal end of the first branch channel (150). Specifically, the first temperature sensor (155) may be provided, for example, on a portion of the first branch channel (150) between a third control valve (153) and a low-temperature channel (13) or on a portion of the low-temperature channel (13) between a low-temperature heat exchanger (41) and the basal end of the first branch channel (150).

The second temperature sensor (165) is connected to a second pump-side pipe (14a). Specifically, the second temperature sensor (165) detects a temperature (a second temperature (T2)) between a second port (36) of the pump (30)

and a basal end of a second branch channel (160). The second temperature sensor (165) may be provided at any other location along the heating medium circuit (11) as long as the first temperature sensor (165) can detect a temperature corresponding to the temperature between the pump (30) and the basal end of the second branch channel (160). Specifically, the second temperature sensor (165) may be provided, for example, on a portion of the second branch channel (160) between a fourth control valve (163) and the high-temperature channel (14) or on a portion of the high-temperature channel (14) between the high-temperature heat exchanger (42) and the basal end of the second branch channel (160).

When, just like the fifth embodiment, the controller (70) according to the seventh embodiment controls the third control valve (153) based on a comparison between the first pressure (P1) and the set value (Ps), the controller (70) corrects the set value (Ps) based on the first temperature (T1) detected by the first temperature sensor (155). Specifically, since the saturated vapor pressure of a heating medium varies depending on temperature, the set value (Ps) is corrected based on temperature. Thus, the precise saturated vapor pressure is determined. This allows the pressure on the suction side of the pump (30) to be reliably prevented from being below the saturated vapor pressure during a cooling operation.

Likewise, when the controller (70) according to the seventh embodiment controls the fourth control valve (163) based on a comparison between the second pressure (P2) and the set value (Ps), the controller (70) corrects the set value (Ps) based on the second temperature (T2) detected by the second temperature sensor (165). This allows the pressure on the suction side of the pump (30) to be reliably prevented from being below the saturated vapor pressure during a heating operation.

Such correction based on temperature may be used in a control operation of the sixth embodiment.

Eighth Embodiment

Figure 18:
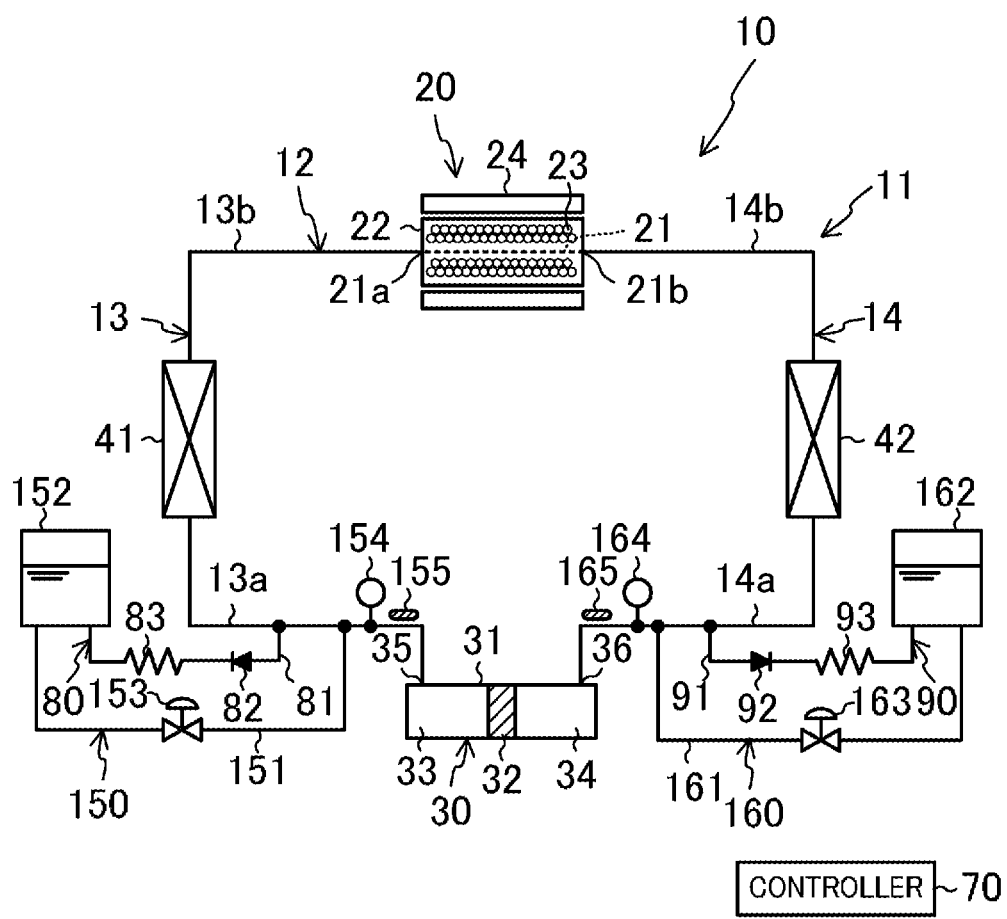
FIG. 18 corresponds to FIG. 10 and illustrates an eighth embodiment.

As shown in FIG. 18, in an eighth embodiment, the heating medium circuit (11) according to the fourth embodiment is connected to return circuits (80, 90) for returning a heating medium to accumulators (152, 162). Specifically, the heating medium circuit (11) is connected to a first return circuit (80) corresponding to a first accumulator (152) or a low-temperature channel (13), and a second return circuit (90) corresponding to a second accumulator (162) or a high-temperature channel (14). The first return circuit (80) includes a first return pipe (81), a low-temperature check valve (82), and a first channel resistor (83). The second return circuit (90) includes a second return pipe (91), a high-temperature check valve (92), and a second channel resistor (93).

One end of the first return pipe (81) is connected to a portion of the low-temperature channel (13) between a low-temperature heat exchanger (41) and a first port (35) of a pump (30). The other end of the first return pipe (81) is connected to the first accumulator (152). The first return pipe (81) is connected to the low-temperature check valve (82) and the first channel resistor (83) in this order from the one end toward the other end of the first return pipe (81). In other words, the first channel resistor (83) is connected between the first accumulator (152) and the low-temperature check valve (82). The low-temperature check valve (82) allows the heating medium to flow from the low-temperature channel (13) toward the first accumulator (152), and disallows the heating medium to flow in the reverse direction. The first channel resistor (83) is comprised of a slender pipe that defines a channel having a smaller diameter than the first return pipe (81).

One end of the second return pipe (91) is connected to a portion of the high-temperature channel (14) between a high-temperature heat exchanger (42) and a second port (36) of the pump (30). The other end of the second return pipe (91) is connected to the second accumulator (162). The second return pipe (91) is connected to the high-temperature check valve (92) and the second channel resistor (93) in this order from the one end toward the other end of the second return pipe (91). In other words, the second channel resistor (93) is connected between the second accumulator (162) and the high-temperature check valve (92). The high-temperature check valve (92) allows the heating medium to flow from the high-temperature channel (14) toward the second accumulator (162), and disallows the heating medium to flow in the reverse direction. The second channel resistor (93) is comprised of a slender pipe that defines a channel having a smaller diameter than the second return pipe (91).

In the eighth embodiment, when the amount of the heating medium in the first accumulator (152) decreases excessively, and the internal pressure of the first accumulator (152) decreases, the heating medium in the low-temperature channel (13) can be transferred through the first return circuit (80) to the first accumulator (152). In other words, when the internal pressure of the first accumulator (152) becomes lower than that of the low-temperature channel (13), the difference between these internal pressures allows the heating medium in the low-temperature channel (13) to flow into the first return pipe (81). The heating medium in the first return pipe (81) passes through the low-temperature check valve (82) and the first channel resistor (83) in this order, and flows into the first accumulator (152). The heating medium therefore can be added to the first accumulator (152).

Likewise, when the amount of the heating medium in the second accumulator (162) decreases excessively, and the internal pressure of the second accumulator (162) decreases, the heating medium in the high-temperature channel (14) can be transferred through the second return circuit (90) to the second accumulator (162). In other words, when the internal pressure of the second accumulator (162) is lower than that of the high-temperature channel (14), the difference between these internal pressures allows the heating medium in the high-temperature channel (14) to flow into the second return pipe (91). The heating medium in the second return pipe (91) passes through the high-temperature check valve (92) and the second channel resistor (93) in this order, and flows into the second accumulator (162). The heating medium therefore can be added to the second accumulator (162).

The return circuits (80, 90) according to the eighth embodiment may be used in any of the fifth to seventh embodiments. Either one or both of the low-temperature check valve (82) and the high-temperature check valve (92) may be removed from the associated return circuit(s) (80, 90).

Variations of Embodiment

The above-described embodiments may be configured as indicated in the following variations. Note that the fourth embodiment including features of each of the variations will be exemplified below.

Fifth Variation

Figure 19:
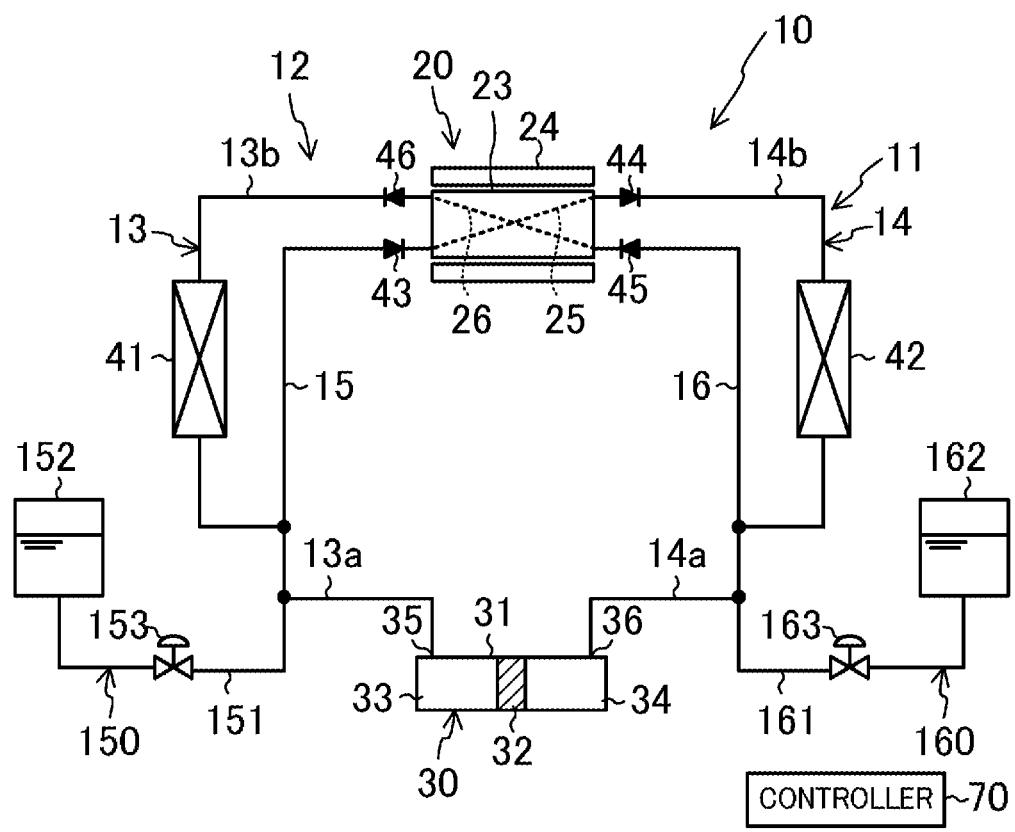
FIG. 19 corresponds to FIG. 10 and illustrates a fifth variation.

FIG. 19 illustrates a fifth variation, in which a bed (22) of a single magnetic refrigeration unit (20) has two temperature control channels (a heating channel (25) and a cooling channel (26)). The heating channel (25) allows a heating medium that is about to be transferred to a high-temperature heat exchanger (42) during a heating operation to flow therethrough. The cooling channel (26) allows a heating medium that is about to be transferred to a low-temperature heat exchanger (41) during a cooling operation to flow therethrough.

The inlet end of the heating channel (25) is connected through a low-temperature bypass channel (15) to a first pump-side pipe (13a). The low-temperature bypass channel (15) is connected to a first check valve (43). The first check valve (43) allows the heating medium to flow through the low-temperature bypass channel (15) only toward the heating channel (25), and disallows the heating medium to flow in the reverse direction.

The outlet end of the heating channel (25) is connected through a second magnetic-refrigeration-unit-side pipe (14b) to the high-temperature heat exchanger (42). The second magnetic-refrigeration-unit-side pipe (14b) is connected to a second check valve (44). The second check valve (44) allows the heating medium to flow through the second magnetic-refrigeration-unit-side pipe (14b) only toward the high-temperature heat exchanger (42), and disallows the heating medium to flow in the reverse direction.

The inlet end of the cooling channel (26) is connected through a high-temperature bypass channel (16) to a second pump-side pipe (14a). The high-temperature bypass channel (16) is connected to a third check valve (45). The third check valve (45) allows the heating medium to flow through the high-temperature bypass channel (16) only toward the cooling channel (26), and disallows the heating medium to flow in the reverse direction.

The outlet end of the cooling channel (26) is connected through a first magnetic-refrigeration-unit-side pipe (13b) to the low-temperature heat exchanger (41). The first magnetic-refrigeration-unit-side pipe (13b) is connected to a fourth check valve (46). The fourth check valve (46) allows the heating medium to flow through the first magnetic-refrigeration-unit-side pipe (13b) only toward the low-temperature heat exchanger (41), and disallows the heating medium to flow in the reverse direction.

In the heating operation of the fifth variation, the heating medium transferred by a pump (30) during the first operation passes through the low-temperature bypass channel (15), and then flows through the heating channel (25). In the heating channel (25), the heating medium is heated by a magnetic working substance (23). The heated heating medium is transferred to the high-temperature heat exchanger (42), and is used to heat a target to be heated. The heating medium in the high-temperature channel (14) is sucked into a second port (36) of the pump (30).

Also in the heating operation of the fifth variation, closing the third control valve (153) allows the heating medium to be prevented from flowing into the first branch channel (150). Opening the fourth control valve (163) allows reduction in cavitation near the second port (36) of the pump (30).

In the cooling operation of the fifth variation, the heating medium transferred by the pump (30) during the second operation passes through the high-temperature bypass channel (16), and then flows through the cooling channel (26). In the cooling channel (26), the heating medium is cooled by the magnetic working substance (23). The cooled heating medium is transferred to the low-temperature heat exchanger (41), and is used to cool a target to be cooled. The heating medium in the low-temperature channel (13) is sucked into a first port (35) of the pump (30).

Also in the cooling operation of the fifth variation, closing the fourth control valve (163) allows the heating medium to be prevented from flowing into the second branch channel (160). Opening the third control valve (153) allows reduction in cavitation near the first port (35) of the pump (30).

Sixth Variation

Figure 20:
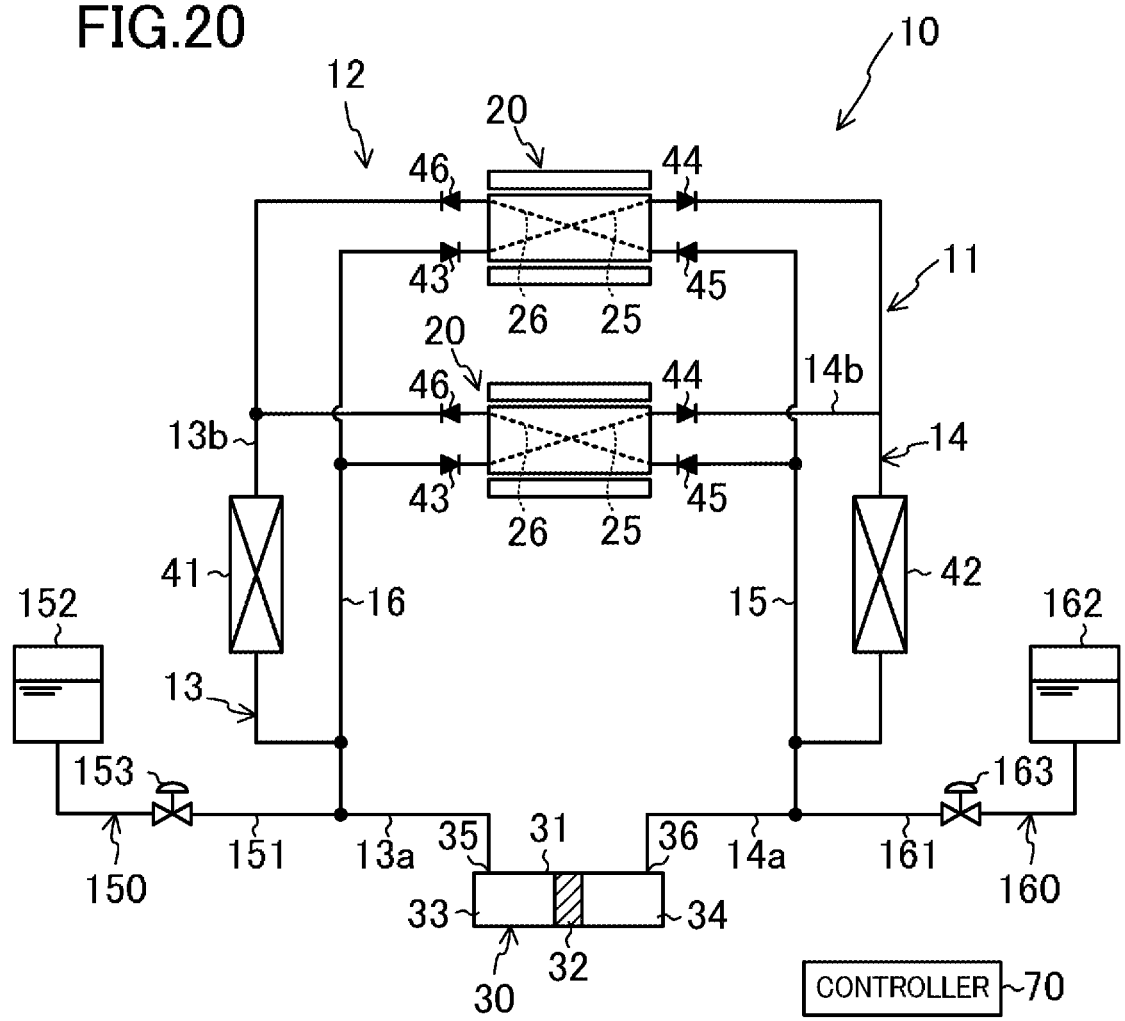
FIG. 20 corresponds to FIG. 10 and illustrates a sixth variation.

FIG. 20 illustrates a sixth variation, in which a heating medium circuit (11) similar to that of the fifth variation includes a plurality of (in this variation, two) magnetic refrigeration units (20) connected together in parallel. Thus, in a heating operation, a heating medium in a low-temperature channel (13) is heated in each of heating channels (25) of the two magnetic refrigeration units (20), and is then transferred to a high-temperature heat exchanger (42). In a cooling operation, the heating medium in a high-temperature channel (14) is cooled in each of cooling channels (26) of the two magnetic refrigeration units (20), and is then transferred to a low-temperature heat exchanger (41).

Also in the heating operation of the sixth variation, closing the third control valve (153) allows the heating medium to be prevented from flowing into the first branch channel (150). Opening the fourth control valve (163) allows reduction in cavitation near the second port (36) of the pump (30).

Also in the cooling operation of the sixth variation, closing the fourth control valve (163) allows the heating medium to be prevented from flowing into the second branch channel (160). Opening the third control valve (153) allows reduction in cavitation near the first port (35) of the pump (30).

Seventh Variation

Figure 21:
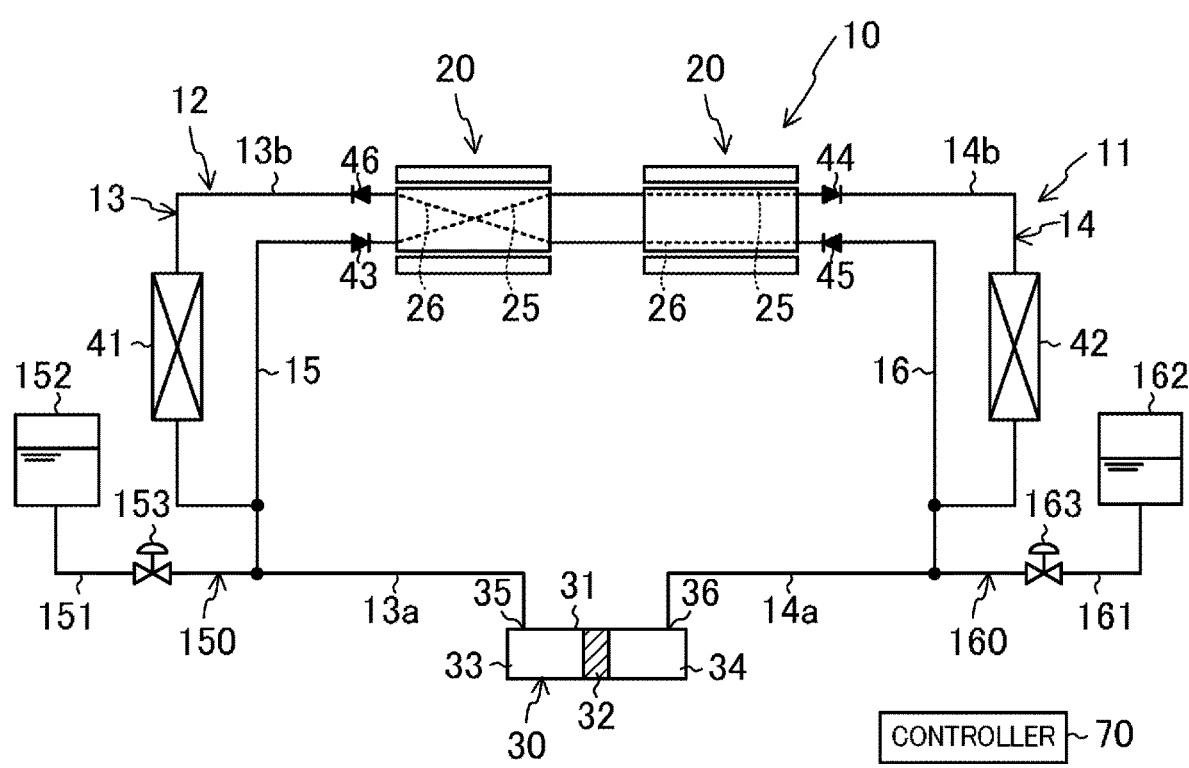
FIG. 21 corresponds to FIG. 10 and illustrates a seventh variation.

FIG. 21 illustrates a seventh variation, in which a heating medium circuit (11) similar to that of the fifth variation includes a plurality of (in this variation, two) magnetic refrigeration units (20) connected together in series. Thus, in a heating operation, a heating medium in a low-temperature channel (13) is heated in heating channels (25) of the magnetic refrigeration units (20) in sequence, and is then transferred to a high-temperature heat exchanger (42). In a cooling operation, the heating medium in a high-temperature channel (14) is cooled in cooling channels (26) of the magnetic refrigeration units (20) in sequence, and is then transferred to a low-temperature heat exchanger (41).

Also in the heating operation of the seventh variation, closing the third control valve (153) allows the heating medium to be prevented from flowing into the first branch channel (150). Opening the fourth control valve (163) allows reduction in cavitation near the second port (36) of the pump (30).

Also in the cooling operation of the seventh variation, closing the fourth control valve (163) allows the heating medium to be prevented from flowing into the second branch channel (160). Opening the third control valve (153) allows reduction in cavitation near the first port (35) of the pump (30).

Other Embodiments

The above-described embodiments and variations may be configured as follows.

The fluid transfer mechanism according to each of the above-described embodiments is a reciprocating piston pump. However, the fluid transfer mechanism is merely an example, and may have any configuration as long as the fluid transfer mechanism alternately performs the first and second operations. For example, a combination of a one-through pump and a channel switching mechanism that changes the flow of a heating medium may form a fluid transfer mechanism.

The intermediate channel (51) (branch channel (50)) of the above-described embodiments is connected between the first and second pump-side pipes (13a) and (14a). However, the intermediate channel (51) may be connected between the first and second magnetic-refrigeration-unit-side pipes (13b) and (14b).

Figure 22:
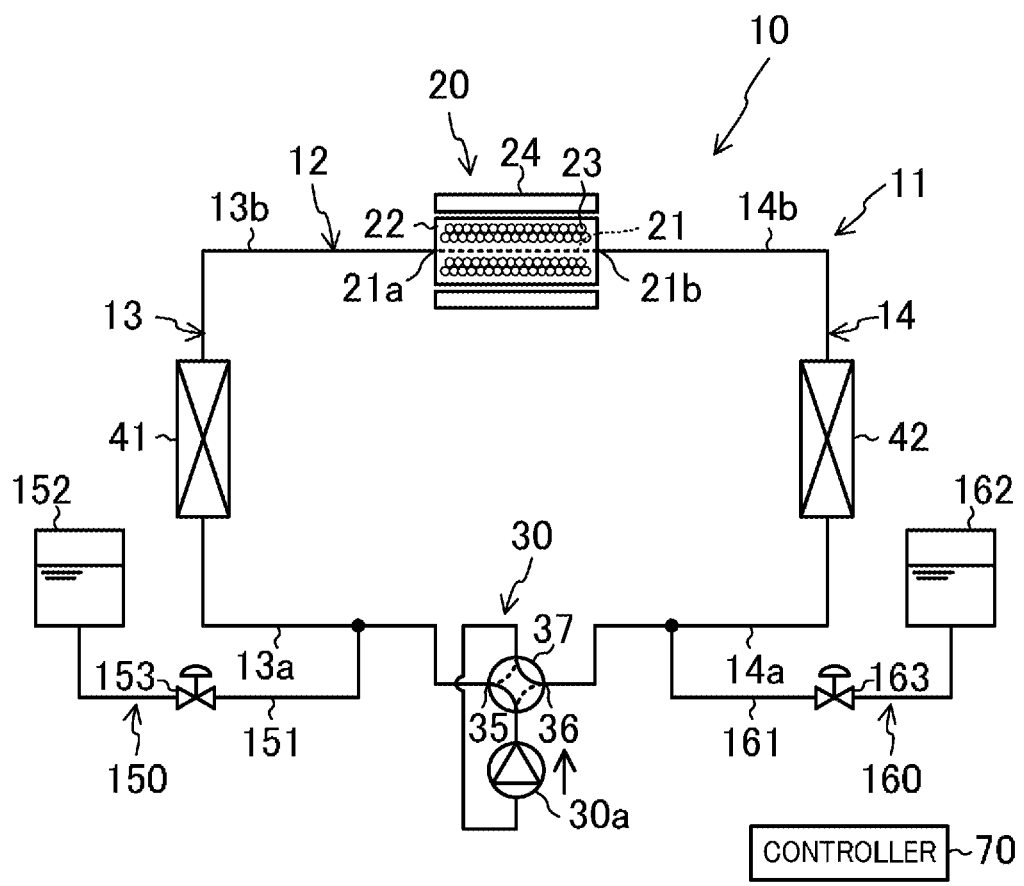
FIG. 22 corresponds to FIG. 10 and illustrates another embodiment.

For example, as shown in FIG. 22, a combination of a one-through pump (30a) and a channel switching mechanism (37) that changes the flow of a heating medium may form a fluid transfer mechanism (30). The channel switching mechanism (37) is switched to a first state (a state indicated by a solid line in FIG. 22) in a first operation, and is switched to a second state (a state indicated by a broken line in FIG. 22) in a second operation. The channel switching mechanism (37) in the first state causes a discharge side of the one-through pump (30a) and the low-temperature channel (13) to communicate with each other, and causes a suction side of the one-through pump (30a) and the high-temperature channel (14) to communicate with each other, in parallel. The channel switching mechanism (37) in the second state causes the discharge side of the one-through pump (30a) and the high-temperature channel (14) to communicate with each other, and causes the suction side of the one-through pump (30a) and the low-temperature channel (13) to communicate with each other, in parallel.

In the first operation, the third control valve (153) does not always have to be fully closed. For example, the opening degree of the third control valve (153) may be reduced, and the flow rate of the heating medium flowing into the first branch channel (150) may be reduced. Likewise, in the second operation, the fourth control valve (163) does not always have to be fully closed. For example, the opening degree of the fourth control valve (163) may be reduced, and the flow rate of the heating medium flowing into the second branch channel (160) may be reduced.

While the embodiments and variations thereof have been described above, it will be understood that various changes in form and details may be made without departing from the spirit and scope of the claims. The embodiments and the variations thereof may be combined and replaced with each other without deteriorating intended functions of the present disclosure.

The expressions of "first," "second," "third," described above are used to distinguish the words to which these expressions are given, and the number and order of the words are not limited.

As can be seen from the foregoing description, the present disclosure is useful for a magnetic refrigeration apparatus.

The invention claimed is:

1. A magnetic refrigeration apparatus comprising:
a main channel through which a heating medium flows;
a magnetic refrigerator including
a magnetic working substance,
a casing having a channel connected to the main channel and containing the magnetic working substance, and
a magnetic field modulator configured to apply a magnetic field variation to the magnetic working substance;
a fluid transfer mechanism connected to the main channel, the fluid transfer mechanism being configured to alternately perform
a first operation of transferring the heating medium in the main channel in a first direction, and
a second operation of transferring the heating medium in a second direction opposite to the first direction; and
at least one control valve,
the main channel including
a first channel between one end of the channel of the magnetic refrigerator and the fluid transfer mechanism,
a second channel between an other end of the channel of the magnetic refrigerator and the fluid transfer mechanism, and
at least one branch channel branching from a portion of the main channel between the magnetic refrigerator and the fluid transfer mechanism,
the at least one branch channel including an intermediate channel connected between the first and second channels, the first and second channels communicating with each other through the intermediate channel, the intermediate channel having an internal volume that is greater than an amount of the heating medium discharged during each of the first and second operations of the fluid transfer mechanism, and
the at least one control valve being connected to the at least one branch channel.

2. The magnetic refrigeration apparatus of claim 1, wherein
the intermediate channel includes a cylinder through which the first and second channels communicate with each other, and
the cylinder includes a partitioning member
movable forward and backward, and
partitioning an interior of the cylinder into two internal channels.

3. The magnetic refrigeration apparatus of claim 2, wherein
each of the internal channels of the cylinder has a maximum volume that is greater than an amount of the heating medium discharged during each of the first and second operations of the fluid transfer mechanism.

4. The magnetic refrigeration apparatus of claim 1, further comprising:
a low-temperature heat exchanger connected to the first channel and to which the heating medium cooled in the magnetic refrigerator is transferable; and
a high-temperature heat exchanger connected to the second channel and to which the heating medium heated in the magnetic refrigerator is transferable;
the at least one control valve being connected to a portion of the intermediate channel closer to the second channel than to the first channel.

5. The magnetic refrigeration apparatus of claim 1, further comprising:
a low-temperature heat exchanger connected to the first channel and to which the heating medium cooled in the casing is transferable; and
a high-temperature heat exchanger connected to the second channel and to which the heating medium heated in the casing is transferable,
one end of the intermediate channel being connected to a portion of the first channel between the fluid transfer mechanism and the low-temperature heat exchanger, and
an other end of the intermediate channel being connected to a portion of the second channel between the fluid transfer mechanism and the high-temperature heat exchanger.

6. The magnetic refrigeration apparatus of claim 1, wherein
the at least one branch channel includes
a first branch channel branching from a portion of the main channel between one end of the channel of the magnetic refrigerator and the fluid transfer mechanism, and
a second branch channel branching from a portion of the main channel between an other end of the channel of the magnetic refrigerator and the fluid transfer mechanism,
the main channel is connected to the first branch channel and the second branch channel, and
the at least one control valve includes control valves respectively connected to the first and second branch channels.

7. The magnetic refrigeration apparatus of claim 6, further comprising:
a controller configured to close one of the control valves on a discharge side of the fluid transfer mechanism.

8. The magnetic refrigeration apparatus of claim 7, wherein
the controller is further configured to close the one of the control valves on the discharge side of the fluid transfer mechanism in synchronization with one of the first and second operations of the fluid transfer mechanism.

9. The magnetic refrigeration apparatus of claim 7, wherein
the controller is further configured to open an other one of the control valves on a suction side of the fluid transfer mechanism in synchronization with one of the first and second operations of the fluid transfer mechanism.

10. The magnetic refrigeration apparatus of claim 7, wherein
the main channel is connected to
a first pressure sensor configured to detect a pressure corresponding to a pressure between the first branch channel and the fluid transfer mechanism, and
a second pressure sensor configured to detect a pressure corresponding to a pressure between the second branch channel and the fluid transfer mechanism, and
when a pressure detected by one of the first and second pressure sensors becomes higher than a first value, the controller is further configured to close the control valve of one of the first and second branch channels corresponding to the one of the first and second pressure sensors.

11. The magnetic refrigeration apparatus of claim 10, wherein
when a pressure detected by one of the first and second pressure sensors becomes lower than a second value, the controller is further configured to open the control valve of one of the first and second branch channels corresponding to the one of the first and second pressure sensors.

12. The magnetic refrigeration apparatus of claim 11, wherein
the first value is greater than the second value.

13. The magnetic refrigeration apparatus of claim 11, wherein
the main channel is connected to
a first temperature sensor configured to detect a temperature corresponding to a temperature between the first branch channel and the fluid transfer mechanism, and
a second temperature sensor configured to detect a temperature corresponding to a temperature between the second branch channel and the fluid transfer mechanism, and
the controller is further configured to correct the second value based on the temperature detected by an associated one of the first and second temperature sensors.

\* \* \* \* \*